(12) United States Patent
Pandian et al.

(10) Patent No.: US 11,625,723 B2
(45) Date of Patent: Apr. 11, 2023

(54) RISK ASSESSMENT THROUGH DEVICE DATA USING MACHINE LEARNING-BASED NETWORK

(71) Applicant: PAYPAL, INC., San Jose, CA (US)

(72) Inventors: Manickkam Pandian, Fremont, CA (US); Souradeep Sen, San Jose, CA (US); Ranjit K. Valasa, Fremont, CA (US); Suchita Shridhar Shirke, San Jose, CA (US); Sabarirajan Jeeva, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 16/886,135

(22) Filed: May 28, 2020

(65) Prior Publication Data
US 2021/0374754 A1 Dec. 2, 2021

(51) Int. Cl.
*G06Q 20/40* (2012.01)
*G06N 20/00* (2019.01)

(52) U.S. Cl.
CPC ......... *G06Q 20/4016* (2013.01); *G06N 20/00* (2019.01)

(58) Field of Classification Search
CPC .................................. G06Q 20/4016
USPC ......................................... 705/39
See application file for complete search history.

(56) References Cited

U.S. PATENT DOCUMENTS

| | | | | |
|---|---|---|---|---|
| 9,178,880 B1* | 11/2015 | Dotan | ................... | H04W 12/06 |
| 2012/0266231 A1* | 10/2012 | Spiers | ..................... | H04L 67/10 |
| | | | | 726/12 |
| 2015/0046338 A1* | 2/2015 | Laxminarayanan | ........................ | |
| | | | | G06Q 20/38215 |
| | | | | 705/67 |
| 2015/0127512 A1* | 5/2015 | Studnitzer | .............. | G06Q 40/04 |
| | | | | 705/37 |
| 2015/0199689 A1* | 7/2015 | Kumnick | ........... | G06Q 20/4016 |
| | | | | 705/67 |
| 2015/0348042 A1* | 12/2015 | Jivraj | ................... | G06Q 20/326 |
| | | | | 705/44 |

(Continued)

FOREIGN PATENT DOCUMENTS

| CN | 112799636 | 8/2021 |
|---|---|---|
| KR | 2019-0093012 | 8/2019 |

(Continued)

*Primary Examiner* — Lindsay M Maguire
(74) *Attorney, Agent, or Firm* — Haynes and Boone, LLP

(57) ABSTRACT

There are provided systems and methods for a machine learning-based network trained to perform risk assessment through device data. A service provider server receives device data of a user device associated with a merchant account registered with a merchant server for a merchant service, and receives, from the merchant server, a request containing a unique token identifier for initiating a risk assessment operation to generate a device assessment score for the user device, where the device assessment score indicates a level of risk between the user device and the merchant account. The service provider server selects a risk assessment engine to perform the risk assessment operation and generates the device assessment score and a narrative for the device assessment score, and sends, to the merchant server through an application programming interface, a message containing a unique device identifier for the user device, the device assessment score and the narrative.

20 Claims, 8 Drawing Sheets

(56) References Cited

U.S. PATENT DOCUMENTS

| | | | |
|---|---|---|---|
| 2017/0103388 A1* | 4/2017 | Pillai | G06Q 20/3823 |
| 2018/0005209 A1* | 1/2018 | Ranganathan | G06Q 20/12 |
| 2018/0240107 A1* | 8/2018 | Andrade | G06Q 20/36 |
| 2019/0333055 A1* | 10/2019 | Mohammed | G06Q 20/4014 |
| 2020/0026699 A1 | 1/2020 | Zhang et al. | |
| 2020/0175503 A1 | 6/2020 | Sarin | |
| 2020/0183917 A1 | 6/2020 | Duchastel et al. | |

FOREIGN PATENT DOCUMENTS

| | | |
|---|---|---|
| WO | WO 2020/126025 | 6/2020 |
| WO | WO 2020/227984 | 11/2020 |

\* cited by examiner

RISK ASSESSMENT THROUGH DEVICE DATA USING MACHINE LEARNING-BASED NETWORK

TECHNICAL FIELD

The present application generally relates to machine learning-based networks trained for device evaluation and more particularly to an engine having a machine learning-based network trained to perform risk assessment through device data.

BACKGROUND

Electronic service providers may provide an online marketplace environment for users, which may be used to buy and sell goods with other entities. Some of these services may be used maliciously by fraudulent users, such as overtaking a merchant account and taking control of payments made for goods sold, which poses a significant risk to these service providers. Since the service providers may process thousands (or more) transactions daily, it may be difficult to review without a large review and compliance team.

Moreover, tactics in performing prohibited transactions electronically are ever-evolving and becoming more sophisticated. Electronic service providers need to keep pace with the fraudulent users in providing security measures, such as accurately evaluating risk (e.g., detecting prohibited transactions) in real-time. In this regard, computer models are often utilized to assist in evaluating risks of electronic transactions in real-time.

Figure 1:
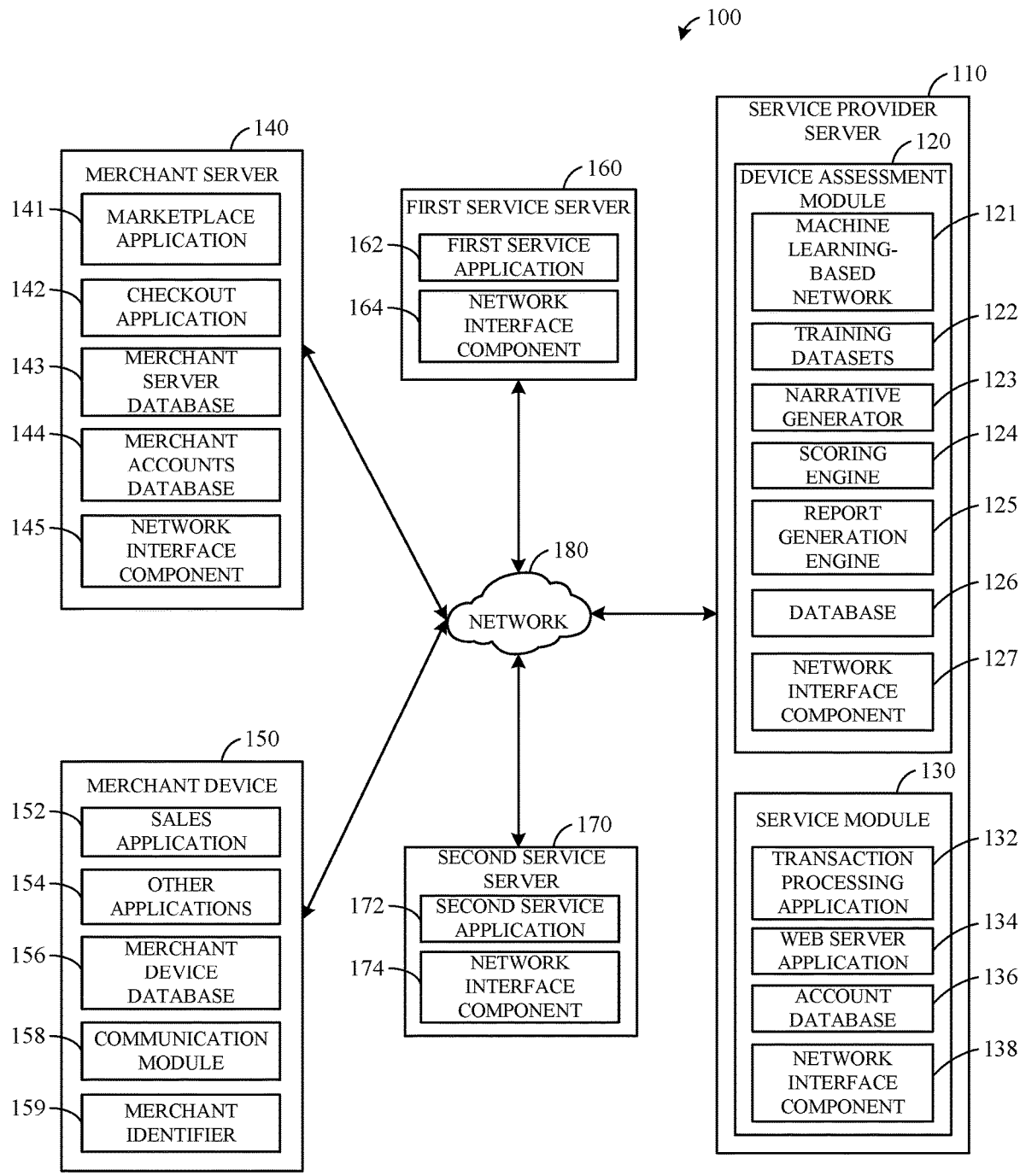
FIG. 1 illustrates a block diagram of a networked system suitable for implementing the processes described herein, according to an implementation of the present disclosure.

Implementations of the present disclosure and their advantages are best understood by referring to the detailed description that follows. It should be appreciated that like reference numerals are used to identify like elements illustrated in one or more of the figures, wherein showings therein are for purposes of illustrating implementations of the present disclosure and not for purposes of limiting the same.

DETAILED DESCRIPTION

Service providers, such as payment processing entities, face an increasing risk management challenge. Any third-party account take-over (ATO) may not be protected by a service provider. In some instances, fraudulent merchants (e.g., fraud sellers) can emerge and create a significant brand impact for these payment processing entities. There are unauthorized users with the motive to perform prohibited activity (can be referred to as "fraudsters") in an online marketplace environment that search for opportunities to take control of item listings maintained by legitimate merchants on a platform maintained by an online marketplace provider. In some instances, a merchant account of a legitimate merchant is taken over by fraudsters that take control of monetary payments made to the merchant account that are to be settled by the legitimate merchant. Over time, the online marketplace provider may experience a decrease in the number of users (e.g., customers) interacting with its online marketplace platform and/or a decrease in the number of transactions processed by the online marketplace platform. There may be many entities that partner with a service provider for certain services, whom are keen on leveraging risk management of the service provider. The service provider can add value to a partnership with a payment processing entity to build trust with that payment processing entity. The occurrence of these types of fraudulent activities can adversely affect the business relationship between the service provider and online marketplace provider.

The subject technology provides for systems and methods of risk assessment through device data with a trained machine learning-based network for analyzing and providing a predictive outcome indicative of device risks. In this regard, the subject technology enables a service provider to manage risk between entities and merchants and assess device risks for entities to identify potential ATO attacks and/or other types of fraudulent activities such as automated script attacks on their platform. In some aspects, the subject technology provides for the service provider to receive additional data from entities that indicate suspicious merchant account activity, merchant behavior, and abrupt changes in a merchant's rating score. The subject technology enables the service provider to notify other entities (e.g., other merchant servers) of a merchant device's risk assessment results and/or risk assessment rating that can provide an advanced alert of potential prohibited activity on the platforms of the other entities.

The service provider can provide a platform that performs risk assessment through device data. The platform facilitates an entity to share data about unauthorized users having acted maliciously to defraud a legitimate merchant and/or identify vulnerable merchant accounts that are susceptible to recurring patterns of prohibited activity. The data sharing between the entities and service provider may be comparable to an entity or user reporting an occurrence of email spam. In this respect, the entities may push the device data and/or session data to the service provider and request for the service provider to perform the device risk assessment. Also, entities may require guidance on risk management to reduce their loss exposure and manage their trust with the service provider.

The subject technology includes a device risk assessment application programming interface (API) for internal and external entities to manage identity risk at any time during a life-cycle of its users (e.g., customers). The device risk assessment API may interface to a merchant service to receive information about a merchant (e.g., merchant identifier and/or merchant account identifier) on its platform and the platform can use the received merchant information for linking the identified merchant and/or identified merchant account to other entities. In some instances, the merchant information can be collected by the platform when the merchant accesses an account maintained by the service provider (e.g., payment processing account) through the platform of the merchant server and registers and/or links the service provided by the service provider to the platform of the merchant server. The risk assessment platform can issue a remedial action onto the merchant account (e.g., place a hold on a pending transaction associated with the merchant account) and/or directly to the merchant device (e.g., deny access to the payment processing service maintained by the service provider). The risk assessment platform of the service provider can facilitate monetary recovery for entities when a merchant account associated with a service provider user account is taken over by an unauthorized user and the service provider becomes liable for the monetary losses incurred on the merchant account. Through the power of risk models implemented by machine learning-based networks, the risk assessment platform can predict potential financial outcomes (e.g., bankruptcy) for entities that continue interactions with a particular merchant device and/or predict which merchant devices and/or merchant accounts are high likelihood of high risk to the entities (e.g., fraudulent/malicious merchants) and share the risk assessment information upfront for increased risk level controls on both entity and service provider systems. For example, entities that interact with merchants on their platforms can manage their respective risk levels with merchants.

The subject technology provides several benefits in device risk assessment and risk management with entities by providing centralized fraud information, reducing the number of third-party ATO occurrences, and reducing the loss exposure for entities. For example, the subject technology can prevent botnet attacks and/or automated script attacks. The subject technology can provide a transparent user experience and minimize transaction interruptions involving trusted devices. For example, the subject technology can prevent fraudsters (or reduce the number of fraudsters) from transacting on either of the entity platform or the service provider platform.

FIG. 1 is a block diagram of a networked system 100 suitable for implementing the processes described herein, according to an implementation of the present disclosure. The electronic transaction system 100 includes a service provider server 110 associated with an electronic payment provider, a merchant server 140, and a merchant device 150 that may be communicatively coupled with each other via a network 180. The electronic transaction system 100 also includes a first service server 160 and a second service server 170, communicably coupled to the service provider server 110 via the network 180. In some implementations, the service provider server 110 may be communicably coupled directly to each of the first service server 160 and/or the second service server 170. The network 180, in one implementation, may be implemented as a single network or a combination of multiple networks. For example, in various implementations, the network 180 may include the Internet and/or one or more intranets, landline networks, wireless networks, and/or other appropriate types of communication networks. In another example, the network 180 may include a wireless telecommunications network (e.g., cellular phone network) adapted to communicate with other communication networks, such as the Internet.

The service provider server 110, in one implementation, may be maintained by a transaction processing entity or an electronic service provider, which may provide electronic services (e.g., selling of merchandise processing, purchasing of merchandise, performing electronic transactions, etc.). As such, the service provider server 110 may include a service module 130, which may be adapted to interact with the merchant device 150 and/or the merchant server 140 over the network 180 to facilitate the searching, selection, purchase, payment of items, and/or other services offered by the service provider server 110. In one example, the service provider server 110 may be provided by PayPal®, Inc. of San Jose, Calif., USA, and/or one or more financial institutions or a respective intermediary that may provide multiple point of sale devices at various locations to facilitate transaction routings between merchants and, for example, financial institutions. The service provider service 110 may include a device assessment module 120, which may be adapted to interact with the merchant server 140 over the network 180 to facilitate the detecting, remediating, and/or other risk assessment and fraud protection services offered to partners by the electronic payment provider via the service provider server 110. The device assessment module 120 includes a machine learning-based network 121, training datasets 122, a narrative generator 123, a scoring engine 124, a report generation engine 125, a database 126, and a network interface component 127, which are discussed in more detail in FIG. 3. In some implementations, the device assessment module 120 is adapted to communicate with the service module 130 and/or to the merchant server 140 using the network interface component 127 interfaced to the service module 130 and the merchant server 140.

In some implementations, the service provider server 110 is communicably coupled to the first service server 160 to receive session data associated with a web server application interaction with the merchant device 150. The first service server 160, in one implementation, may be maintained by a transaction monitoring entity or an electronic identity verification provider, which may provide electronic services (e.g., identity services, transaction monitoring services, and/or authentication services). As such, the first service server 160 may include a first service application 162, which may be adapted to interact with the merchant server 140 to initiate a first service session with a unique token identifier passed on by the merchant server 140 to help identify the merchant server 140 and/or merchant accounts associated with the merchant server 140. The first service server 160 also includes a network interface component 164. In some implementations, the first service server 160 is adapted to communicate with the merchant server 140 and/or the service provider server 110 using the network interface component 164. The first service server 160 may receive session data of a web server application interaction with the merchant device 150 and remote diagnostic agent (RDA) information from the web server application, through the network interface component 164. In some aspects, the session data may indicate prohibited activity (e.g., malicious, fraudulent, or illegal activity) in the interaction between the merchant device 150 and the web server application. In some instances, the prohibited activity is identified by the merchant server 140. The first service server 160 may communicate the received session data to the service provider server 110 via the network interface component 164.

In some implementations, the service provider server 110 is communicably coupled to the second service server 170 to receive device data associated with the merchant device 150. The second service server 170, in one implementation, may be maintained by a device registration entity or an electronic device reader, which may provide electronic services (e.g., collect device data from interactions between the merchant device 150 and the merchant server 140 and/or with the service provider server 110). As such, the second service server 170 may include a second service application 172, which may be adapted to interact with the merchant server 140 to initiate a second service session with the unique token identifier passed on by the merchant server 140 to help identify the merchant server 140 and/or merchant accounts associated with the merchant server 140. The second service server 170 also includes a network interface component 174. In some implementations, the second service server 170 is adapted to communicate with the merchant server 140 and/or the service provider server 110 using the network interface component 174. The second service server 170 may receive device data of a merchant device, such as the merchant device 150, and RDA information from the merchant device 150, through the network interface component 174. The second service server 170 may communicate the received device data to the service provider server 110 via the network interface component 174.

In various implementations, the service provider server 110 includes the device assessment module 120 that is adapted to receive an incoming request from the merchant server 140 to perform a risk assessment of the merchant device 150 through the device data and/or the session data, associated with the merchant device 150. In other implementations, the request may include a specific request for the device assessment module 120 to perform a risk assessment operation involving multiple merchant devices, including the merchant device 150. In still other implementations, the request may include a specific request for the device assessment module 120 to perform a risk assessment operation on one or more merchant accounts maintained by the merchant server 140, where at least one of the merchant accounts is associated with the merchant device 150. As such, when a new request is received at the service provider server 110 (e.g., by the network interface component 127), the device assessment module 120 may analyze the device data and/or the session data (e.g., based on information stored in the database 126) with the machine learning-based network 121 and determine the loss exposure to the merchant server 140 for a particular merchant account (inclusive of a set of transactions over a period of time). The loss exposure may be indicative of the amount of risk (or risk level) imposed on the merchant account and/or to the merchant server by one or more interactions with the merchant device 150. In some aspects, the device assessment module 120 may transmit an indication of a remedial action in response to the determined loss exposure, which may cause the merchant server 140 to apply the remedial action on the merchant account. For example, the merchant server 140 may deny a sale transaction initiated by the merchant device 150 or other actions that reduces the loss exposure to the merchant server 140. In other aspects, the service provider server 110 may issue the remedial action to be applied directly to the merchant device 150. For example, the service provider server 110 may place a hold on a payment transaction via the service module 130. In some instances, the service provider server 110 may apply the remedial action to more than one merchant server that is associated with the merchant device 150 and/or send a notification to other merchant servers to alert them of the fraudulent and/or malicious behavior of the merchant device 150 that poses a significant risk to the merchant servers and associated services.

In various implementations, service provider server 110 includes at least one network interface component 127 adapted to communicate with merchant server 140 and/or other entities over network 180. In various implementations, network interface component 127 may include a modem, an Ethernet device, a broadband device, a satellite device and/or various other types of wired and/or wireless network communication devices including microwave, radio frequency (RF), and infrared (IR) communication devices.

In various implementations, the service module 130 includes a transaction processing application 132, a web server application 134, an account database 136 and a network interface component 138. In some implementations, the service module 130 is adapted to communicate with the device assessment module 120 using the network interface component 138 interfaced to the device assessment module 120.

In some implementations, the transaction processing application 132 is adapted to process purchases and/or payments for financial transactions between a user and a merchant. In one implementation, the transaction processing application 132 assists with resolving financial transactions through validation, delivery, and settlement. As such, the transaction processing application 132 settles indebtedness between a user and a merchant, in which accounts may be directly and/or automatically debited and/or credited of monetary funds in a manner as accepted by the banking industry.

The service module 130 may also include a web server application 134 that is configured to interact with a web browser of the merchant device 150 by serving web content to users in response to HTTP requests. As such, the web server application 134 may include pre-generated web content ready to be served to users. For example, the web server application 134 may store a log-in page and is configured to serve the log-in page to users for logging into user accounts of the users to access various service provided by the service module 130. The web server application 134 may also include other webpages associated with the different electronic services offered by the service module 130. As a result, a user may access a user account associated with the user and access various services offered by the service module 130, by generating HTTP requests directed at the service module 130.

The service module 130, in one implementation, may be adapted to maintain one or more user accounts, merchant accounts, and transaction records in the account database 136. As such, the account database 136 may store account information associated with one or more individual users (e.g., the user associated with merchant device 150) and merchants and transaction data associated with transactions. For example, account information may include private financial information of users and merchants, such as one or more account numbers, passwords, credit card information, banking information, digital wallets used, or other types of financial information. The transaction records may include Internet Protocol (IP) addresses, device information associated with the transaction, transaction dates, transaction amounts, payor identities, payee identities, etc. In certain implementations, account information also includes user purchase profile information such as account funding options and payment options associated with the user, payment information, receipts, and other information collected in response to completed funding and/or payment transactions.

In one implementation, a user may have identity attributes stored with the service module 130, and the user may have credentials to authenticate or verify identity with the service module 130. User attributes may include personal information, banking information and/or funding sources. In various aspects, the user attributes may be passed to the service module 130 as part of a login, search, selection, purchase, and/or payment request, and the user attributes may be utilized by the service module 130 to associate the user with one or more particular user accounts maintained by the service module 130.

Merchant server 140 may include a merchant server database 143 identifying available products and/or services (e.g., collectively referred to as items) made available by, or on behalf of, a merchant associated with the merchant device 150, for viewing and purchase by a non-merchant user device (not shown). According to various aspects of the present disclosure, the merchant server 140 may also host a website for an online marketplace, where sellers and buyers may engage in purchasing transactions with each other. The descriptions of the items or products offered for sale by the merchants (also referred to as "sellers") may be stored in the merchant server database 143. The merchant may have a physical point-of-sale (POS) store front. The merchant may be a participating merchant who has a merchant account with an online marketplace provider via the merchant server 140 and a user account with the electronic payment provider via the service provider server 110. Merchant server 140 may be used for POS or online purchases and transactions. The merchant server 140, in various implementations, may be maintained by a business entity (or in some cases, by a partner of a business entity that processes transactions on behalf of business entity). Examples of businesses entities include an online marketplace sites, merchant sites, resource information sites, utility sites, real estate management sites, social networking sites, etc., which offer various items for purchase and process payments for the purchases. Generally, merchant server 140 may be maintained by anyone or any entity that receives money, which includes charities as well as retailers and restaurants. For example, a purchase transaction may be payment or gift to an individual.

The merchant server 140, in one implementation, may include a marketplace application 141, which may be adapted to provide information over the network 180 to the network interface component 145 of the merchant device 150. For example, the user of the merchant device 150 may interact with the marketplace application 141 through the network interface component 145 over the network 180 to search and view various items available for purchase in the merchant server database 143.

Merchant server 140 also may include a checkout application 142 which may be configured to facilitate the purchase by a user of goods or services online or at a physical point-of-service (POS) or store front. Checkout application 142 may be configured to accept payment information from or on behalf of the user through service provider server 110 over the network 180. For example, checkout application 142 may receive and process a payment confirmation from the service provider server 110 via the service module 130, as well as transmit transaction information to the service module 130 and receive information from the service module 130 (e.g., a transaction ID). Checkout application 142 may be configured to receive payment via a plurality of payment methods including cash, credit cards, debit cards, checks, money orders, or the like.

Merchant server 140 may further include the merchant server database 143 stored on a transitory and/or non-transitory memory of merchant device 150, which may store various applications and data and be utilized during execution of various modules of merchant device 150. Database 143 may include, for example, identifiers such as operating system registry entries, cookies associated with marketplace application 141, identifiers associated with hardware of merchant device 150, or other appropriate identifiers, such as identifiers used for payment/user/device authentication or identification, which may be communicated as identifying the user/merchant device 150 to service provider server 110. Database 143 may further include any transaction data sets used for training and/or processing with a machine learning model generated by service provider server 110.

The merchant accounts database 144 may be adapted to store information about merchant accounts registered to merchant devices, including the merchant device 150. The merchant accounts may be indicative of the merchant devices having access to a service provided by the merchant server 140. The merchant accounts database 144, in one implementation, may include at least one merchant identifier (not shown), which may be included as part of the one or more items made available for purchase so that, e.g., particular items are associated with the particular merchants. In one implementation, the merchant identifier may include one or more attributes and/or parameters related to the merchant device 150, such as business and banking information. The merchant identifier may include attributes related to the merchant server 140, such as identification information (e.g., a serial number, a location address, GPS coordinates, a network identification number, etc.).

Merchant server 140 includes at least one network interface component 145 adapted to communicate with service provider server 110. In various implementations, network interface component 145 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

The merchant device 150 may also use the merchant server 140 to communicate with the service provider server 110 over the network 180. For example, the merchant device 150 may use the merchant server 140 to communicate with the service provider server 110 in the course of various services offered by the service provider to a merchant, such as a payment intermediary between customers of the merchant and the merchant itself. For example, the merchant server 140 may use an application programming interface (API) that allows it to offer sale of goods in which customers are allowed to make payment through the service provider server 110, while the user may have an account with the service provider server 110 that allows the user to use the service provider server 110 for making payments to merchants that allow use of authentication, authorization, and payment services of the service provider as a payment intermediary. The merchant may also have an account with the service provider server 110. Even though only one merchant server 140 is shown in FIG. 1, it has been contemplated that one or more merchant servers (each similar to merchant server 140) may be communicatively coupled with the service provider server 110 and the merchant device 150 via the network 180 in the system 100.

The merchant device 150, in various implementations, may be implemented using any appropriate combination of hardware and/or software configured for wired and/or wireless communication over the network 180. In various implementations, the merchant device 150 may include at least one of a wireless cellular phone, wearable computing device, PC, laptop, etc.

Sales application 152 may correspond to one or more processes to execute modules and associated specialized hardware of merchant device 150 that provides an interface and/or online marketplace to sell one or more items offered by a merchant (not shown) associated with merchant device 150, and further provide checkout and payment processes for a transaction to purchase the items for sale from the merchant corresponding to merchant device 150, where such transaction processing services may be provided through service module 130. In this regard, sales application 152 may correspond to specialized hardware and/or software of merchant device 150 to provide a convenient interface to permit a merchant to offer items for sale. For example, sales application 152 may be implemented as an application offering items for sale that may be utilized by the merchant or a merchant employee to enter items selected by a user to a transaction, determine a price for the transaction, and initiate a checkout and payment process for the transaction.

In certain implementations, sales application 152 may correspond to a website available over the Internet and/or online content and/or database information accessible through a dedicated application. Thus, sales application 152 may provide item sales through an online marketplace using the website of the merchant. However, in other implementations, merchant device 150 may be local to a physical merchant location and provide transaction processing processes through interfaces displayed to a merchant or merchant employee at the merchant location. Sales application 152 may include information for a price for the item, a discount for the item, a price change for the item, and/or other incentives for items and/or with the merchant corresponding to merchant device 150 (e.g., rebates, payments, etc.). Sales application 152 may be used to set and/or determine a benefit or incentive provided to a user of a communication device (not shown). The sales data and other item data may be retrievable by communication device and/or service module 130, such as requestable through an API call, retrievable from a database, and/or scraped from an online resource.

Sales application 152 may be used to establish a transaction once the user associated with communication device has selected one or more items for purchase. Once a payment amount is determined for the transaction for the item(s) to be purchased, sales application 152 may request payment from the user through a transaction processing flow provided by the service module 130. Sales application 152 may receive payment processing information. Thus, payment provided to the merchant account, and notification of payment (or failure, for example, where there are insufficient user funds) may be sent to sales application 152. The payment may be made by service module 130 on behalf of the user associated with communication device. In other implementations, sales application 152 may direct the user to one or more interfaces provided by service module 130 for transaction processing.

Thus, sales application 152 may include one or more interfaces to engage in a transaction processing flow. In other implementations, the merchant may not view the transaction processing, which may be performed by the user associated with communication device. Sales application 152 may then receive the results of the transaction processing, and complete the transaction with the user, for example, by providing the user the items for the transaction or declining the transaction where the user is not authenticated or the transaction is not authorized (e.g., insufficient funds).

In one implementation, the sales application 152 includes a browser module that provides a network interface to browse information available over the network 180. For example, the browser module may be implemented, in part, as a web browser to view information available over the network 180. The sales application 152, in one implementation, includes a user interface (e.g., a web browser, a mobile application, etc.), which may be utilized by the merchant to conduct electronic transactions (e.g., selling, perform electronic payments, etc.) with the merchant server 140 over the network 180. In one aspect, sale transactions earnings may be directly and/or automatically added to an account related to the merchant via the sales application 152.

The merchant device 150, in various implementations, may include other applications 154 as may be desired in one or more implementations of the present disclosure to provide additional features available to the user. For example, other applications 154 may include security applications for implementing server-side security features, programmatic client applications for interfacing with appropriate application programming interfaces (APIs) over network 180, or other types of applications. Other applications 154 may also include email, texting, voice and IM applications that allow a user to send and receive emails, calls, texts, and other notifications through network 180. In various implementations, other applications 154 may include financial applications, such as banking, online payments, money transfer, or other applications associated with service provider server 110. Other applications 154 includes a software program, such as a graphical user interface (GUI), executable by a processor that is configured to interface to a user.

Merchant device 150 may further include merchant device database 156 stored to a transitory and/or non-transitory memory of merchant device 150, which may store various applications and data and be utilized during execution of various modules of merchant device 150. Thus, merchant device database 156 may include, for example, identifiers such as operating system registry entries, cookies associated with sales application 152 and/or other applications 154, identifiers associated with hardware of merchant device 150, or other appropriate identifiers, such as identifiers used for payment/user/device authentication or identification, which may be communicated as identifying merchant device 150 to merchant server 140. Database 156 may include webpage and/or application information for a transaction processing flow type, as well as received transaction information for processing a transaction using the transaction processing flow type. In various implementations, account information and/or digital wallet information may be stored to merchant device database 156 for use by merchant device 150.

Merchant device 150 includes at least one communication module 158 adapted to communicate with the merchant server 140 and/or the service provider server 110. In various implementations, communication module 158 may include a modem, an Ethernet device, a broadband device, a satellite device and/or various other types of wired and/or wireless network communication devices including microwave, radio frequency, infrared, Bluetooth, and near field communication devices.

The merchant device 150, in one implementation, may include at least one merchant identifier 159, which may be implemented, for example, as operating system registry entries, cookies associated with the communication module 158, identifiers associated with hardware of the merchant device 150 (e.g., a media control access (MAC) address), or various other appropriate identifiers. The user identifier 118 may include one or more attributes related to the user of the merchant device 150, such as personal information related to the user (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the merchant identifier 159 may be passed with a user login request to the service provider server 110 via the network 180, and the merchant identifier 159 may be used by the service provider server 110 to associate the user with a particular user account maintained by the service provider server 110.

Even though only one merchant device 150 is shown in FIG. 1, it has been contemplated that one or more user devices (each similar to merchant device 150) may be communicatively coupled with the service provider server 110 via the network 180 within the networked system 100.

Network 180 may be implemented as a single network or a combination of multiple networks. For example, in various implementations, network 180 may include the Internet or one or more intranets, landline networks, wireless networks, and/or other appropriate types of networks. Thus, network 180 may correspond to small scale communication networks, such as a private or local area network, or a larger scale network, such as a wide area network or the Internet, accessible by the various components of system 100.

Figure 2:
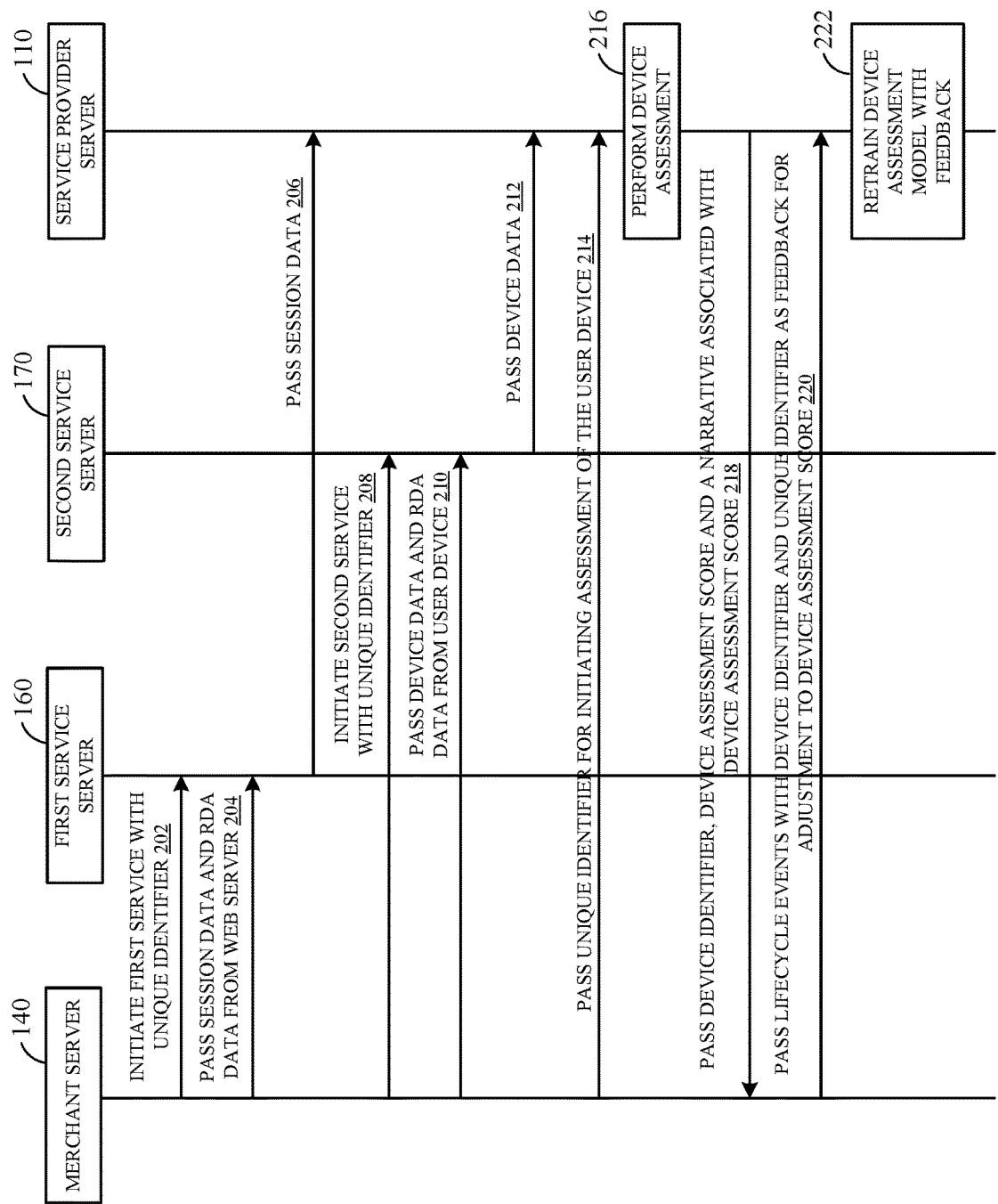
FIG. 2 illustrates a simplified message exchange in a networked system, according to an implementation of the present disclosure.

FIG. 2 illustrates a simplified message exchange in a networked system, according to an implementation of the present disclosure. In various instances, the merchant server 140 identifies an ATO attack on a merchant account or detects users (e.g., merchants) involved in prohibited activity on its platform.

At action 202, the merchant server 140 sends a message to the first service server 160 with a unique token identifier associated with the merchant server 140 to initiate a first service at the first service server 160. At action 204, the merchant server 140 passes session data of an interaction with web server application and RDA data from the web server application. In some implementations, the service provider server 110 is communicably coupled to the first service server 160 to receive session data associated with a web server application interaction with the merchant device 150. The first service server 160, in one implementation, may be maintained by a transaction monitoring entity or an electronic identity verification provider, which may provide electronic services (e.g., identity services, transaction monitoring services, and/or authentication services). As such, the first service server 160 may include a first service application 162, which may be adapted to interact with the merchant server 140 to initiate a first service session with a unique token identifier passed on by the merchant server 140 to help identify the merchant server 140 and/or merchant accounts associated with the merchant server 140. The first service server 160 also includes a network interface component 164. In some implementations, the first service server 160 is adapted to communicate with the merchant server 140 and/or the service provider server 110 using the network interface component 164. The first service server 160 may receive session data of a web server application interaction with the merchant device 150 and RDA information from the web server application, through the network interface component 164. In some aspects, the session data may indicate prohibited activity (e.g., malicious, fraudulent, or illegal activity) in the interaction between the merchant device 150 and the web server application. In some instances, the prohibited activity is identified by the merchant server 140. The first service server 160 may communicate the received session data to the service provider server 110 via the network interface component 164. At action 206, the first service server 160 passes the session data to the service provider server 110.

At action 208, the merchant server 140 sends a message to the second service server 170 with the unique token identifier associated with the merchant server 140 to initiate a second service at the second service server 170. At action 210, the merchant server 140 passes device data of a merchant device (e.g., the merchant device 150) and RDA data from the merchant device. In some implementations, the service provider server 110 is communicably coupled to the second service server 170 to receive device data associated with the merchant device 150. The second service server 170, in one implementation, may be maintained by a device registration entity or an electronic device reader, which may provide electronic services (e.g., collect device data from interactions between the merchant device 150 and the merchant server 140 and/or with the service provider server 110). As such, the second service server 170 may include a second service application 172, which may be adapted to interact with the merchant server 140 to initiate a second service session with the unique token identifier passed on by the merchant server 140 to help identify the merchant server 140 and/or merchant accounts associated with the merchant server 140. The second service server 170 also includes a network interface component 174. In some implementations, the second service server 170 is adapted to communicate with the merchant server 140 and/or the service provider server 110 using the network interface component 174. The second service server 170 may receive device data of a merchant device, such as the merchant device 150, and RDA information from the merchant device 150, through the network interface component 174. The second service server 170 may communicate the received device data to the service provider server 110 via the network interface component 174. At action 212, the second service server 170 passes the device data to the service provider server 110.

At action 214, the merchant server 140 sends a message to the service provider server 110 with the unique token identifier for initiating risk assessment operation of the merchant device. The service provider server 110 receives a request to initiate a risk assessment operation on a merchant identified with the ATO attack or on a merchant identified to be involved in prohibited activity. The request includes a unique token identifier of the merchant server 140 for initiating the risk assessment of the merchant device. The service provider server 110 can utilize the received data of the merchant server 140 to produce strategies that reduce an amount of risk for the merchant server 140 by sending a device risk assessment score with a narrative explaining the risk rating to the merchant server 140 or by performing a remedial action directly on the merchant device (e.g., placing a monetary hold on a user account, or declining a transaction). In various implementations, the service provider server 110 includes the device assessment module 120 that is adapted to receive an incoming request from the merchant server 140 to perform a risk assessment of the merchant device 150 through the device data and/or the session data, associated with the merchant device 150. In other implementations, the request may include a specific request for the device assessment module 120 to perform a risk assessment operation involving multiple merchant devices, including the merchant device 150. In still other implementations, the request may include a specific request for the device assessment module 120 to perform a risk assessment operation on one or more merchant accounts maintained by the merchant server 140, where at least one of the merchant accounts is associated with the merchant device 150.

At action 216, the service provider server 110 performs the device risk assessment of the merchant device. The service provider server 110 can include the machine learning-based network 121 to predict a risk likelihood metric. As such, when a new request is received at the service provider server 110 (e.g., by the network interface component 127), the device assessment module 120 may analyze the device data and/or the session data (e.g., based on information stored in the database 126) with the machine learning-based network 121 and determine the loss exposure to the merchant server 140 for a particular merchant account (inclusive of a set of transactions over a period of time). The loss exposure may be indicative of the amount of risk (or risk level) imposed on the merchant account and/or to the merchant server by one or more interactions with the merchant device 150. In some aspects, the device assessment module 120 may transmit an indication of a remedial action in response to the determined loss exposure, which may cause the merchant server 140 to apply the remedial action on the merchant account. For example, the merchant server 140 may deny a sale transaction initiated by the merchant device 150 or other actions that reduces the loss exposure to the merchant server 140. In other aspects, the service provider server 110 may issue the remedial action to be applied directly to the merchant device 150. For example, the service provider server 110 may place a hold on a payment transaction via the service module 130. In some instances, the service provider server 110 may apply the remedial action to more than one merchant server that is associated with the merchant device 150 and/or send a notification to other merchant servers to alert them of the fraudulent and/or malicious behavior of the merchant device 150 that poses a significant risk to the merchant servers and associated services.

In some aspects, the machine learning-based network 121 may be agnostic to the events passed by different merchant server platforms. The service provider server 110 can indicate whether RDA data obtained either of the first service server 160 or second service server 170 was sent correctly to the service provider server 110. The service provider server 110 can differentiate between internal versus external customers with the unique device identifier. The service provider server 110 can maintain a variation in a list of pre-computed variables that are respectfully corresponding to different combinations of features (or device attributes) that produce different likelihood scores at different risk levels.

At action 218, the service provider server 110 sends a unique device identifier, device assessment score and a narrative associated with the device assessment score. For example, the service provider server 110 may send the merchant server 140 a message that includes a report with the risk assessment results based on either the session data or device data made available through service-specific payloads from the first service server 160 and the second service server 170, respectively. The risk assessment results may include a device assessment score, a narrative describing reasons for the device assessment score along with a unique device identifier produced by the machine learning-based network 121. In some aspects, the service provider server 110 can share periodic reports about the performance of the device risk assessment with the merchant server 140. The service provider server 110 may include a public device evaluation API that can communicate the unique device identifier, device risk assessment scores, scoring reasons and pre-computed variables to the merchant server 140.

The service provider server 110 can include a feedback loop with the merchant server 140. At action 220, the merchant server 140 sends a feedback message to the service provider server 110 with information on lifecycle events with the unique device identifier and unique token identifier as feedback for retraining the machine learning-based network and/or adjusting the device assessment score. In some aspects, the machine learning-based network 121 has a feedback channel from the merchant server 140 to help re-train the machine learning-based network 121. For example, the machine learning-based network 121 can receive feedback about ATO attacks and other fraud notifications from the merchant server 140. The feedback information may be one of the input variables to improve the performance of the machine learning-based network 121 with a black list and further tagging capabilities to identify bad actors based on the trust and quality of the data.

The merchant server 140 can provide event information over a lifecycle with the merchant server 140 to notify the service provider server 110 of any interactions identified by the merchant server 140 as prohibited activity (e.g., prohibited ATO attacks, prohibited automated script attacks, fraudulent or suspicious transactions, or other illegal transactions, etc.). The service provider server 110 can utilize the feedback data to retrain the machine learning-based network 121 and generate an adjusted device risk assessment score based on the retraining. In some aspects, the merchant server 140 identifies false positives of risk levels assigned to the merchant device 150 and/or to a merchant account, which may be used to retrain the machine learning-based network 121 in a continuous and/or iterative process so that false positives may be reduced and/or eliminated and the machine learning-based network 121 may more accurately predict and detect high-risk merchants and/or merchant devices. The service provider server 110 can store data online and offline for each device evaluation job and feedback. At action 222, the service provider server 110 retrains the machine learning-based network using the received feedback.

Figure 3:
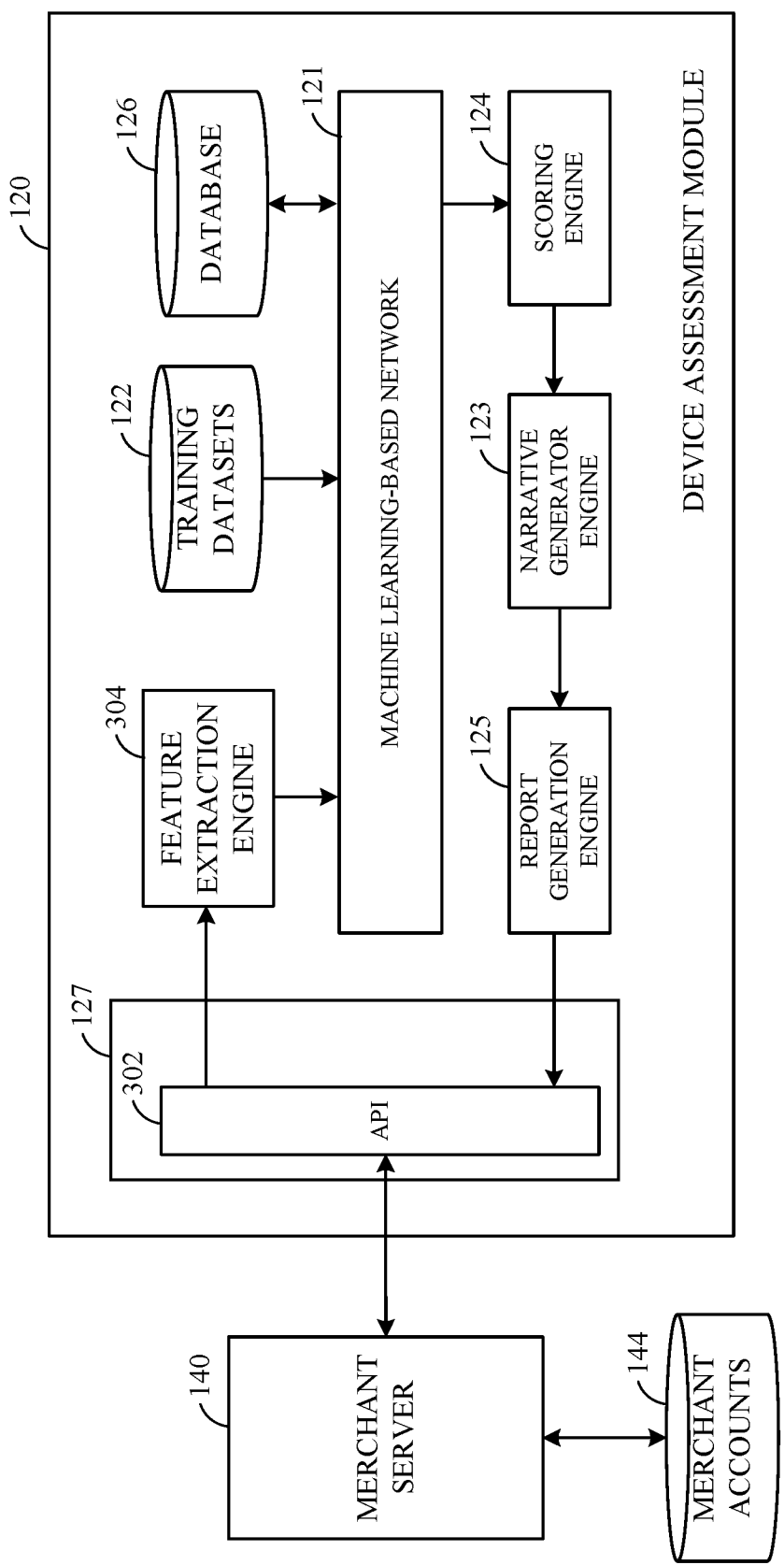
FIG. 3 illustrates a block diagram of a device assessment module, according to an implementation of the present disclosure.

FIG. 3 illustrates a block diagram of a device assessment module, according to an implementation of the present disclosure. The device assessment module 120 is a computer model that receives session data and/or device data related to a device (e.g., merchant device) requesting to perform (or previously performed) an electronic transaction (e.g., an electronic fund transfer (or payment)) or prohibited (or potentially prohibited) transactions, etc., analyzes the data, and produces an outcome (e.g., a risk assessment score) for the request based on a determination of whether the evaluated device is a relatively high risk to a merchant account maintained by the merchant server 140 or the merchant associated with the merchant device is a relatively high risk to the merchant server 140. The data that the device assessment module 120 receives may correspond to a set of features (e.g., extracted by feature extraction engine 304) determined to be used by the device assessment module 120.

As discussed above, malicious users often use different fraud tactics to perform prohibited transactions (e.g., by performing an electronic transaction using a merchant account of another user without authorization, etc.). For example, malicious users may use a phishing technique or a man-in-the-middle attack to obtain user credentials associated with a merchant account maintained by the merchant server 140. Typically, a transaction request initiated by a malicious user (an unauthorized user) may offer clues that the request is not generated by an authorized user (e.g., the legitimate merchant). For example, the transaction request initiated by the unauthorized user usually has characteristics that are different from the characteristics of past transaction requests generated by legitimate merchants. The characteristics may include a location from which the request is generated (e.g., indicated by an IP address of a device that initiated the request), a device type used to initiate the request, a browser type used to initiate the request, etc. Furthermore, due to the fact that the malicious user may not have obtained all of the user credentials, the malicious user may fail a login attempt several times before "guessing" the correct user credentials. As such, the number of times that a failed login attempt has occurred in a period of time may indicate that the request is a fraudulent request. The malicious user may also behave differently from the legitimate user. As such, any behavior that deviates from an account's "normal" behavior (e.g., a transaction amount that differs from an average transaction amount by a threshold amount, etc.) may also indicate that the transaction request may correspond to a fraudulent transaction request (and potential ATO attack).

As such, the device assessment module 120 may obtain session data and/or device data (e.g., device features) related to a source device (e.g., the merchant device 150) identified by the merchant server 140 as a device involved in prohibited (or potentially prohibited) activity, such as a fraudulent electronic transaction request, which may include an IP address of a source device, a device type of the source device, a number of successful transactions conducted for the user account within a period of time, a number of failed transactions using the merchant account attempted within a period of time, a current time, a browser type of a browser used to generate the request, an amount associated with the request, a transaction type of the request, an average transaction amount associated with the payor/payee over a predetermined period of time, and other information related to the request. In some implementations, the device assessment module 120 is trained or configured to predict whether the source device is a risk to the merchant account or whether the merchant associated with the source device is a risk to the merchant server 140, based on the types of prohibited activity involved, the frequency of such prohibited activities, and level of engagement with these types of prohibited activities to determine the amount of risk (or potential loss exposure) imposed on the merchant server 140. As such, the outcome produced by the device assessment module 120 may be a binary outcome that is either a high risk or a low risk. In some implementations, the outcome may be a score (e.g., a risk score) indicating a likelihood that the source device is a high risk. The machine learning-based network 121 may then provide an indication of the outcome generated by the device assessment module 120 to other modules or servers communicably coupled to the service provider server 110, such as the merchant server 140, such that the other servers may apply a remedial action to a merchant account and/or to the source device to reduce the loss exposure.

In some aspects, the network interface component 127 includes API 302. In some aspects, the API 302 may correspond to one of two types of risk APIs. In one aspect, the API 302 may correspond to a payment assessment API that is adapted to provide intelligence for digital payment transactions. A payment assessment API may be utilized by merchants that can leverage the power of a service provider network to authenticate and process their online transactions. In some aspects, the payment assessment API can return risk scores and reason codes, which can be used in custom workflows and/or neural network models to filter through fraudulent payment attempts and in-dispute resolution systems for post-transactional investigations. In another aspect, the API 302 may correspond to a device assessment API that is adapted to provide intelligence about the device fingerprint. A device assessment API may be utilized by merchants that can leverage the service provider intelligence to augment their identity solution to help with account takeover detection, new account fraud, card-not-present (CNP) fraud, and other types of identity fraud. Device assessment APIs can return unique device identifier, risk scores and reason codes for the device and a handful of relevant session variables.

In some implementations, the device assessment module 120 may provide the API 302 that enables the merchant server 140 to access various data in the database 126 to create, adjust, and/or evaluate various candidate features. For example, the API 302 may enable the merchant server 140 to access different data based on the data types (e.g., a transaction date, a transaction amount, a payor identifier, etc.) so that the merchant server 140 is not required to know the data structure of the database 126. Furthermore, based on requests submitted through the API 302, the device assessment module 120 may also calculate one or more values corresponding to a particular feature based on the device data and/or the additional data associated with a source device. For example, the merchant server 140 may submit, via the API 302, a request to perform a device risk assessment operation, which may include generating a feature (e.g., a device feature) with the feature extraction engine 304, where the feature may correspond to a difference between the transaction amount of the electronic transaction and an average transaction amount in previous transactions that involve the payor and/or the payee in an electronic transaction initiated by the source device. Based on the request, the feature extraction engine 304 may acquire different transaction data associated with each transaction record (e.g., accessing the transaction amount of the transaction record and the transaction amounts of previous transactions associated with the payor and/or the payee) from the received device data, the session data and/or the database 126. The feature extraction engine 304 may then calculate, for each transaction record, a value corresponding to the device feature by performing calculation on some of the transaction data associated with the source device. The device assessment module 120 may then provide the calculated values to the machine learning-based network 121.

The device assessment module 120 may correspond to one or more processes to execute software modules and associated specialized hardware of service provider server 110 to analyze the received device data and/or session data. Such device data may include a network address of entities involved in a transaction. The entities, such as the merchant device 150, may establish a connection to the merchant server 140 using the network address, by which the merchant server 140 acquires the network address as part of a process in registering and/or logging entities utilizing its service (e.g., uploading listings of items for sale through the online marketplace). The device data may include other features and/or device attributes of the entity, such as the type of device of the entity, the screen display attributes, the user credentials stored on the entity, the type of web browser installed on the entity, or the like. The session data may include information about the web browser application utilized to initiate the transaction. In some aspects, the session data also may include the network address of the entity, the duration (e.g., amount of time elapsed) of the session (e.g., the connection between the entity and the merchant server 140), the login credentials utilized the entity to establish the session, cookie information indicating one or more web domains accessed by the entity during a time range, and the like. The session data and/or the device data also may include transaction and merchant account information for a transaction and entities involved in the transaction to determine a risk that the entities are acting fraudulently by attempting to take over a merchant account or other type of fraudulent activity, such as botnet attacks or automated script attacks. In this regard, the device assessment module 120 may correspond to specialized hardware and/or software to receive transaction information and/or access account information for determination of whether entities in a transaction are acting fraudulently by taking over a merchant account or executing automated script attacks onto a merchant account for the purpose of defrauding the legitimate merchant (e.g., the true seller), thus posing a significant risk to the entity that maintains the merchant server 140. In some examples, the transaction information for a transaction may correspond to the name or other identifier for entities in the transaction, items involved in the transaction (e.g., sold to one or more entities), a cost of the transaction, additional costs (e.g., tax, tip, etc.), a message for the transaction (e.g., a shipping address, note to customer, item information, etc.), shipping information, and/or other information for the transaction.

Merchant account information may also be utilized by device assessment module 120 to determine whether a particular merchant account is vulnerable to an ATO attack. The account information may include entity information in the merchant account, financial information, past transactions using the merchant account, account purpose and use, and other accounts interacting with the merchant account. In this regard, a merchant account for a named merchant may be utilized to determine that the transaction type is commercial instead of personal for a transaction with a previously unknown user. Similarly, past transactions between the same merchant account and different entities and/or between the same entity and different merchant accounts maintained by the merchant server 140 may be analyzed by the device assessment module 120, such as prior instances where a merchant account was identified by the merchant server 140 as an account that was accessed by unauthorized entities performing a one-time transaction that resulted in a monetary loss to the legitimate merchant. Additionally, it may be detected whether different merchant accounts are linked or share an entity identifier, such as the same name, address, financial information, or other information, in order to determine a pattern in the types of transactions that result in a loss exposure to the merchant server 140.

If a merchant (or other entity) is acting fraudulently with a merchant account maintained by the merchant server 140, the device assessment module 120 may issue a device assessment score that indicates a likelihood that the merchant account is a risk to the merchant server 140. The device assessment module 120 may generate a narrative associated with the device assessment score to provide an explanation and/or reasons as to why the device assessment module 120 issued a particular device assessment score. The narrative may identify features of the merchant device 150 that contribute to the determined risk level for the merchant account. For example, the device assessment module 120 may detect that the merchant account has continued interactions with a merchant device or multiple merchant devices that have a network address (e.g., IP address) tied to a geographical region where fraudulent users are known to reside. The device assessment score along with the narrative can be instructive to the merchant server 140 to better understand the amount of risk taken on by the merchant server 140 when allowing transactions with the analyzed merchant account and/or the merchant device 150.

In some aspects, the device assessment module 120 may generate a flag that marks the merchant account as a risk or a potential risk of a specific type of fraudulent activity (e.g., ATO, automated script attacks, etc.). Thus, during future transaction processing, the merchant account flag may be utilized to determine that the account was previously victimized by fraudulent activity such as by an unauthorized entity taking over the merchant account, and the flag may cause the device assessment module 120 to reevaluate the merchant device and/or the merchant account to adjust the previously-issued device assessment score. In other examples, where the merchant associated with the merchant device 150 is previously flagged as acting abusively by allowing automated script attacks on the merchant account that cause unauthorized payments to the merchant account, future users that wish to process a transaction with the merchant by attempting to purchase an item from the merchant may automatically be guided to a different merchant having a similar item for sale or denied access to complete the transaction when processing transactions with the merchant via the merchant server 140.

The machine learning-based network 121, in one implementation, may be adapted to analyze one or more device features of the merchant device 150 and generate a likelihood metric that indicates a likelihood that the merchant device poses a risk at a particular risk level to a merchant account maintained by the merchant server 140.

The structure of the machine learning-based network 121 may include a neural network with a particular pattern of layers or number of neurons per layer that are used to provide scoring information, such as a risk likelihood metric. The neural network structure can be based on input components. The input components and variables can be based on the session data and/or device data. In some aspects, the input components represent the extracted features from the device data and/or the session data. In some aspects, the variables represent different combinations of features. For example, one variable set may include a combination of a first feature indicating a network address and a second feature indicating a type of device. In another example, another variable set may include a combination of a first feature indicating a type of transaction, a second feature indicating the monetary amount involved in the transaction and a time-of-day that the transaction occurred. These variables may be used to determine the amount of risk posed by devices having similar types of features. In some implementations, the structure of the machine learning-based network 121 includes multiple neural networks, such that one of the neural networks is selected to perform the device risk assessment operation. In some aspects, the device assessment module 120 can select a risk assessment engine that includes a neural network among multiple risk assessment engines that include respective neural networks.

Each of the different neural networks may correspond to a respective type of device and/or to a respective type of web browser session.

The machine learning-based network 121 may implement specific algorithms to process the device data and/or the session data to determine the risk likelihood metric. For example, the machine learning-based network 121 may be implemented by a log regression algorithm to perform either a binary classification or multi-class classification.

In some aspects, the input data to the machine learning-based network 121 can be normalized, transformed, have outliers removed, or otherwise processed so that its characteristics can help the machine learning-based network 121 produce quality results. For example, the input data that is fed from the respective first and second service servers (e.g., 160, 170) can be automatically transformed into a standard format. The input data may be further transformed into several components to be used in the machine learning-based network 121.

The machine learning-based network 121 or other front-end parsing module (not shown) may generate the input components using multiple variables for a particular device. For example, the input components may be created based on an inference-based data set and predictive methodology to determine the value based on the history of similar variable combinations.

The machine learning-based network 121 may be trained using the training datasets 122. The machine learning-based network 121 can be trained with the device data already stored in the service provider server. In some aspects, aspects of the machine learning-based network 121 can trained with specific subsets of the training data. The machine learning-based network 121 can be trained with historical device data that covers a specified range of time (e.g., the last 18 months of transactions). The machine learning-based network 121 can be updated with further training on later phases and through a process for periodic review. In some aspects, the training of the machine learning-based network 121 may employ a form of parallel processing in order to reduce training time. For example, the training may be performed in a closed offline environment with map reduce technology.

The device assessment module 120 may perform post-processing and interpretation of the output data from the machine learning-based network. For example, the output of the machine learning-based network may be transformed, normalized or run through another algorithm to provide useful output data. The output may include a unique device identifier (also referred to as "machine identifier"). The output also can include device assessment scores and a narrative containing reasoning relating to the device assessment scores. The device assessment score can be normalized between multiple machine learning-based network models based on the input data. The device assessment module 120 can produce models based on a type of device and a type of web session.

The scoring engine 124, in one implementation, may be adapted to generate a device assessment score for the user device. In some aspects, the device assessment score may be derived from a distribution. In this regard, the scoring distribution may be based on the log regression algorithm implemented by the machine learning-based network 121. For example, the device assessment score may be distributed based on the level of risk. For instance, the device assessment score can increase as the corresponding level of risk increases. In other aspects, the scoring engine 124 may implement weights as part of the scoring algorithm. For example, the weights can be identified based on the relevance to a type of prohibited activity (e.g., malicious, fraudulent, or illegal activity).

In some aspects, the scoring engine 124 may implement one or more score thresholds to detect different types of remedial action that would apply to a given device assessment score. Information indicating the type of remedial action can be provided as part of the message containing the device assessment score and narrative to the merchant server 140.

The device assessment module 120 may perform post-processing and interpretation of the output data from the machine learning-based network 121. For example, the output of the machine learning-based network may be transformed, normalized or run through another algorithm to provide useful output data. The output may include a unique device identifier (also referred to as "machine identifier"). The output also can include device assessment scores and a narrative containing reasoning relating to the device assessment scores. The device assessment score can be normalized between multiple machine learning-based network models based on the input data. The device assessment module 120 can include multiple models based on a type of device and a type of web session.

To generate the narratives, a narrative generator 123 may be utilized to output a textual narrative or other displayable format of the overall importance, ranking, or value to each feature in causing a particular classification by the machine learning-based network 121. The feature importance may include a value that the feature contributes to certain decision-making, allowing a view of which features are the most important and comparing features in machine learning decisions by the machine learning-based network 121. An explanation narrative may further be utilized to determine the positive and negative impacts or effects on the prediction by each feature, as well as the amount of the particular positive or negative effect to the decision-making of the machine learning-based network 121. The narratives may include different information associated with the transactions and/or merchant accounts to allow identification of the particular transactions and/or merchant accounts, as well as provide context to the merchant server 140 reviewing the flagged transactions. The narratives may also provide information on the features of the transactions that caused flagging, which may be ranked or selected based on the feature importance. For example, if a feature importance shows account age (e.g., length account is open) or transaction amount as the highest feature to decision-making, then the account age or transaction amount may be displayed. Where the feature is not available or does not apply to the particular transaction, the next highest feature may be selected. Further, both positive and negative effecting features may be displayed, as well as a number based on ranking or importance. The narrative may provide a textual output having the particular data in readable form. Thus, the merchant server 140 may utilize the narrative to guide the merchant server 140 in applying any form of remedial action on a merchant account in accordance with the device assessment score.

In some aspects, the narrative generator 123 may utilize an output graph transformed from the outcome signal fed by the machine learning-based network 121 (e.g., local interpretable model-agnostic explanations (LIME) or SHapley Additive exPlanations (SHAP)). The output graph may include a feature importance of each feature in the flagged transactions, where the feature importance includes data indicating how important the feature was in classifying the transaction (e.g., flagging the transaction as prohibited or not). The output graph may therefore include data showing how the machine learning-based network 121 utilizes the classifiers to classify data points within the training data. Using the output graph, narrative generator may then generate a narrative, which may be output with the flagged (or unflagged) device features to display why the machine learning-based network 121 made particular decisions or predictions.

The report generation engine 125, in one implementation, may be adapted to generate a message that includes the unique device identifier for the user device, the device assessment score and the narrative associated with the device assessment score.

Training datasets 122 may store data necessary for training and utilizing the machine learning-based network 121, such as training data that may include transactions used to train the machine learning-based network 121 or artificial intelligence (AI) model and any fraudulent activity feedback from the merchant server 140. In some aspects, training datasets 122 includes training data for transaction reviewed for prohibited transactions is accessed. The training data may correspond to data sets having different data points (e.g., transactions) that may be processed or accessible to an entity, such as those processed by an online transaction processor, financial entity, or other payment processor. In this regard, the training data may include different features and/or attributes, where these describe the transactions interacted with a source device and allow for decision-making based on the interactions with the source device. Further training datasets 122 may include merchant device behavior data used for training the machine learning-based network 121 for notifying merchant server 140 of identified risks associated with the merchant device 150 and/or processing future transactions by the service module 130 or another transaction processing entity, where transactions may be processed by the machine learning-based network 121 to identify suspicious transaction patterns involving the merchant device 150 and predict a device assessment score that indicates the amount of risk between the merchant device 150 and the merchant account hosted by the merchant server 140.

Training datasets 122 may further include labels for the training data and/or transactions processed by the service module 130. In some aspects, the training data labels include a description of why the machine learning-based network 121 flagged particular merchant accounts and/or merchant devices as a heightened risk. In some implementations, classifiers for the data may be designated (e.g., "prohibited transactions") and/or the data sets may be annotated or labeled with particular transactions flagged as prohibited. The training data may therefore include data that may be processed by agents (not shown) of the service provider server 110 or other entity to determine whether any of the transactions indicate high-risk activity or other prohibited behavior. Moreover, the training data may also include transaction data processed by the regulatory agency of those transactions that are actually prohibited (e.g., a legal or other action has been or will be taken by the agency) and those that are not prohibited or do not rise to the degree of prohibited behavior to cause an action. Thus, such data may be labeled.

The training datasets 122 may include different features, such as a platform for the transaction (e.g., mobile, web, etc.), an account number, a transaction identifier (ID), a transaction type (e.g., payment, gambling, etc.), an encrypted transaction ID, a parent transaction ID, a created and/or update date, a US dollar equivalent amount (e.g., where credits and sent payments may be in a negative format), a local currency amount and/or code, a billing and/or shipping address, a funding source and/or backup funding source, a bank account number, a bank hash-based message authentication code (HMAC), a card number and/or hash, a card bun HMAC, a card issuer, a balance and/or impact on a balance due to the transaction, a transaction status and/or items within the transaction, notes and/or subject lines within messages for the transaction, an automated clearinghouse return codes, an ID on another marketplace or platform, a counterparty name, a counterparty account number, a counterparty account type, a counterparty country code, a counterparty email, a counterparty transaction ID, a counterparty ID on a marketplace or platform, a counterparty account status, a referring URL, an IP address, whether the transaction was successful, and a date (e.g., month/year) of transaction.

Figure 4:
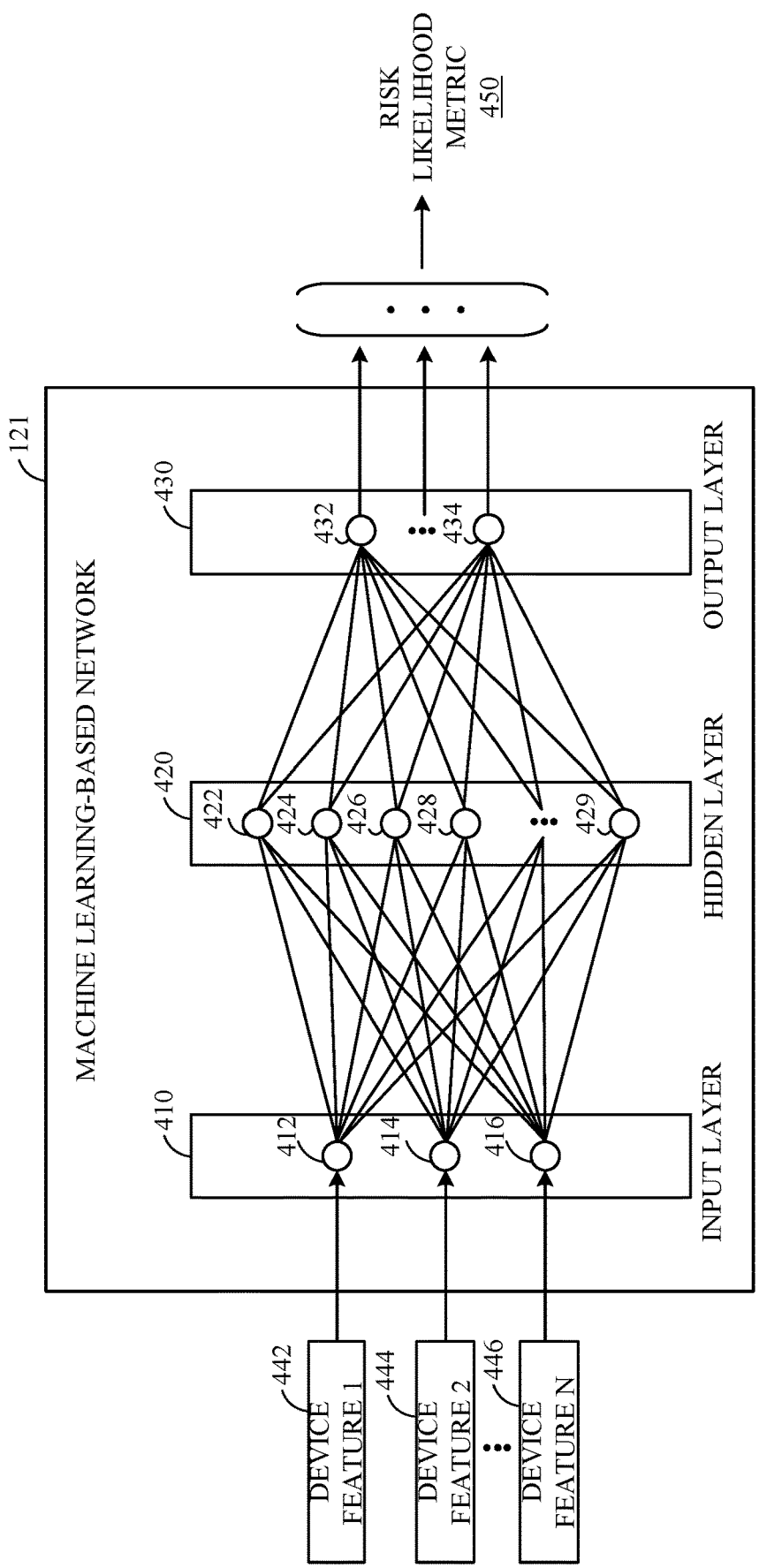
FIG. 4 is an exemplary system environment of an artificial neural network implementing a machine learning model trained for classifications based on training data, according to an implementation of the present disclosure.

FIG. 4 is an exemplary system environment of an artificial neural network implementing a machine learning model trained for classifications based on training data, according to an implementation of the present disclosure.

In this regard, neural network 400 shows an input layer 410, a hidden layer 420, and an output layer 430 of the artificial neural network implementing a machine learning model trained as discussed herein, where the nodes and weights for the hidden layer may be trained using one or more training data sets of transactions for identification of patterns of prohibited conduct or behavior in transaction performance (e.g., transaction processing between users or other entities).

For example, when training machine learning-based network 121, one or more training data sets of training datasets 122 for transactions having different features and feature values may be processed using a supervised machine learning algorithm or technique, such as gradient boosting or random forest algorithms. In some implementations, other types of AI learning may be used, such as deep learning for neural networks. The features within training datasets 122 may include different types of variables, parameters, or characteristics of the underlying transactions, which may have separate values to the variables. This allows for different classifiers of the transactions and variables to be built into known or desired classifications (e.g., "prohibited transaction" or "flagged transaction for review"). These classifiers are trained to detect the transactions of training datasets 122 falling into the classifier using the machine learning technique, which allows identification of similar transactions meeting a specific classification. The classifiers may be generated by the machine learning technique when identifying and grouping transactions and/or designated by a user or agent of the training data set. Thus, training datasets 122 may include transactions falling into specific classifications, such as prohibited transactions and valid or not prohibited transactions. The process may be supervised where the output and classifications are known for the transactions. In some implementations, the training data set may include annotated or labeled data of particular flagged transactions and/or may be reviewed after processed and classified by the machine learning technique for false positives and/or correctly identified and flagged as prohibited transactions.

Neural network 400 may implement machine learning-based network 121 (e.g., a model trained using training datasets 122 of transactions having a distribution of transactions with different risk levels). Neural network 400 includes different layers and nodes to perform decision-making using the machine learning-based network 121. Each of layers 410, 420, and 430 may include one or more nodes. For example, input layer 410 includes nodes 412-

416, hidden layer 420 includes nodes 422-429, and output layer 430 includes nodes 432-434. In this example, each node in a layer is connected to every node in an adjacent layer. For example, node 412 in input layer 410 is connected to all of nodes 422-429 in hidden layer 420. Similarly, node 422 in the hidden layer is connected to all of nodes 412-416 in input layer 410 and nodes 432-434 in output layer 430. Although only one hidden layer is shown for neural network 400, it has been contemplated that neural network 400 used to implement the machine learning-based network 121 for device risk assessment may include as many hidden layers as desired.

In this example, neural network 400 receives a set of input values (e.g., device features 442-446) and produces an output vector (or singular value). Each node in input layer 410 may correspond to a distinct input value. For example, when neural network 400 is used to implement the machine learning-based network 121 for device risk assessment, each node in the input layer 410 may correspond to a distinct attribute derived from the information associated with a merchant device (e.g., merchant device 150) or a merchant account. In some aspects, the information pertains to a device attribute (e.g., a network address, installed browser application, storage capacity, screen dimensions, processor capability, etc.). In other aspects, the information pertains to a session attribute (e.g., cookie information, VID, browser version, session duration, memory utilization for session, domain accessed, etc.). In still other aspects, the information pertains to a transaction (e.g., a transaction time, currency amount, USD equivalent amount, balance affect or account balance, local or general time/date, etc.). In a non-limiting example, node 412 receives device feature 442 (depicted as "device feature 1") that may correspond to an account identifier or name, node 414 receives device feature 444 (depicted as "device feature 2") that may correspond to a network address used by a sending or receiving merchant account, and node 416 receives device feature 446 (depicted as "device feature N") that may correspond to an amount for the transaction. In some aspects, the nodes 412-416 may correspond to an encoded value representing a set of additional values derived from training datasets 122.

In some implementations, each of nodes 422-429 in hidden layer 420 generates a representation, which may include a mathematical computation (or algorithm) that produces a value based on the input values received from nodes 412-416. The mathematical computation may include assigning different weights to each of the data values received from nodes 412-416. In some instances, the weights can be identified based on the relevance to a type of fraudulent activity or type of prohibited transaction. For example, nodes 422-429 may include different algorithms and/or different weights assigned to the data variables from nodes 412-416 such that each of nodes 422-429 may produce a different value based on the same input values received from nodes 412-416. In some implementations, the weights that are initially assigned to the features (or input values) for each of nodes 422-429 may be randomly generated (e.g., using a computer randomizer). The values generated by nodes 422-429 may be used by each of nodes 432-434 in output layer 430 to produce an output value for neural network 400. When neural network 400 is used to implement the machine learning-based network 121 for device risk assessment, the output value produced by neural network 400 may indicate a likelihood that a device has a particular risk level. In some aspects, the neural network 400 may output a vector of likelihood values, where each likelihood value pertains to a different risk level.

The artificial neural network 400 may be trained by using historical electronic transaction data (training data). The historical electronic transaction data may include transaction records for different time periods in the past (e.g., July 2019 through March 2020, July 2018 through March 2019, July 2017 through March 2020, etc.). By providing the training data to the artificial neural network 400, the nodes 422-429 in the hidden layer 420 may be trained (adjusted) such that an optimal output (a likelihood of the source device having a certain risk level at a particular time with respect to a merchant account) is produced in the output layer 430 based on the training data. For example, the output layer 430 can produce a risk likelihood metric 450 that includes the optimal output of the artificial neural network 400. In some aspects, the risk likelihood metric 450 is a vector of likelihood values. In other aspects, the risk likelihood metric 450 is a singular value. By continuously providing different sets of training data and penalizing the artificial neural network 400 when the output is incorrect, the artificial neural network 400 (and specifically, the representations of the nodes in the hidden layer 420) may be trained (adjusted) to improve its performance in detecting risk levels of source devices to a merchant account over time. Adjusting the artificial neural network 400 may include adjusting the weights associated with each node in the hidden layer 420.

Although the above discussions pertain to an artificial neural network as an example of machine learning, it is understood that other types of machine learning methods may also be suitable to implement the various aspects of the present disclosure. For example, support vector machines (SVMs) may be used to implement machine learning. SVMs are a set of related supervised learning methods used for classification and regression. A SVM training algorithm— which may be a non-probabilistic binary linear classifier— may build a model that predicts whether a new example falls into one category or another. As another example, Bayesian networks may be used to implement machine learning. A Bayesian network is an acyclic probabilistic graphical model that represents a set of random variables and their conditional independence with a directed acyclic graph (DAG). The Bayesian network could present the probabilistic relationship between one variable and another variable. Other types of machine learning algorithms are not discussed in detail herein for reasons of simplicity.

Figure 5:
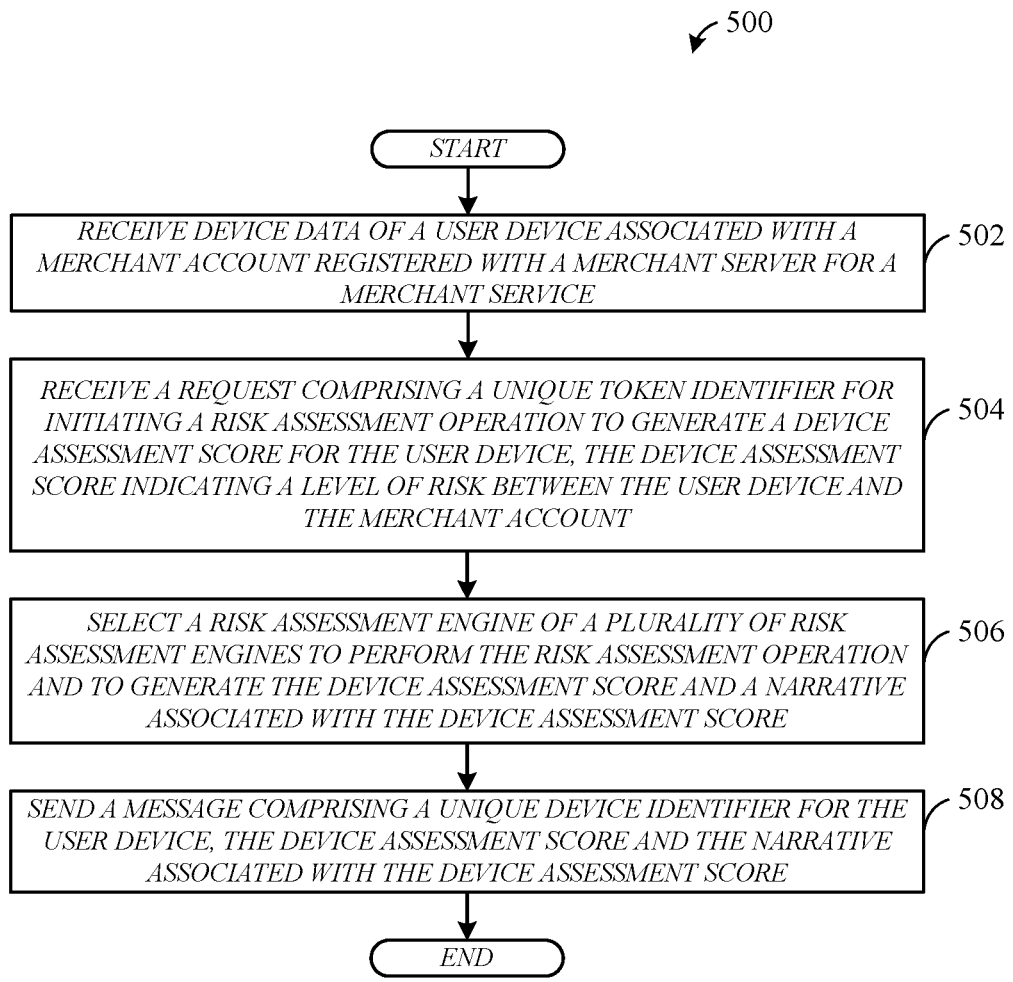
FIG. 5 is a flowchart of an example process of performing a risk assessment of device data, according to an implementation of the present disclosure.

FIG. 5 is a flowchart of an example process 500 of performing a risk assessment of device data, according to an implementation of the present disclosure. One or more of the steps 502-508 of process 500 may be implemented, at least in part, in the form of executable code stored on non-transitory, tangible, machine-readable media that when run by one or more processors may cause the one or more processors to perform one or more of the steps 502-508. Some examples of computing devices, such as computing system 800 may include non-transitory, tangible, machine readable media that include executable code that when run by one or more processors (e.g., processor 812) may cause the one or more processors to perform the steps of process 500. As illustrated, the process 500 includes a number of enumerated steps, but aspects of the process 500 may include additional steps before, after, and in between the enumerated steps. In some aspects, one or more of the enumerated steps may be omitted or performed in a different order.

The process 500 starts at step 502, where the device assessment module 120 receives device data of a user device associated with a merchant account registered with a merchant server for a merchant service. Next, at step 504, the device assessment module 120 receives a request that includes a unique token identifier for initiating a risk assessment operation to generate a device assessment score for the user device. In some aspects, the device assessment score indicates a level of risk between the user device and the merchant account. Subsequently, at step 506, the device assessment module 120 selects a risk assessment engine of a plurality of risk assessment engines to perform the risk assessment operation and to generate the device assessment score and a narrative associated with the device assessment score. Next, at step 508, the device assessment module 120 sends a message that includes a unique device identifier for the user device, the device assessment score and the narrative associated with the device assessment score.

Figure 6:
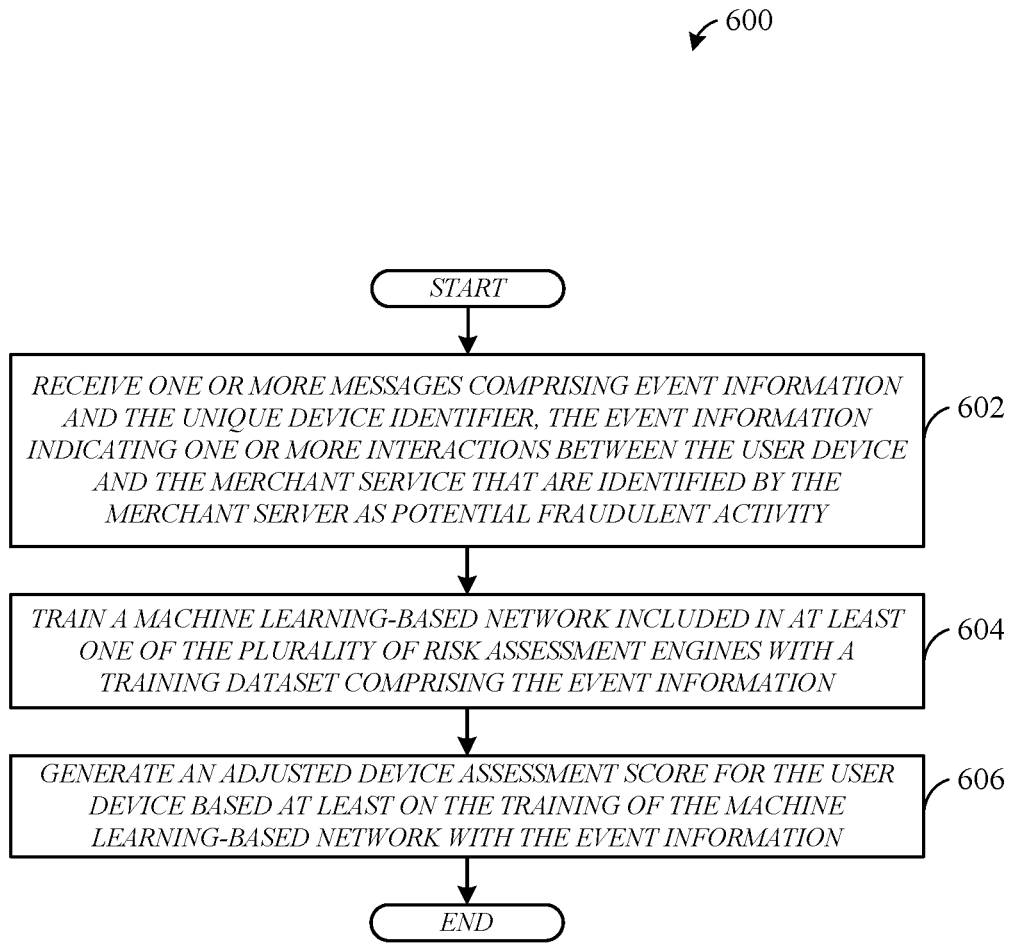
FIG. 6 is a flowchart of an example process of training a device assessment model with feedback, according to an implementation of the present disclosure.

FIG. 6 is a flowchart of an example process 600 of training a device assessment model with feedback, according to an implementation of the present disclosure. One or more of the steps 602-608 of process 600 may be implemented, at least in part, in the form of executable code stored on non-transitory, tangible, machine-readable media that when run by one or more processors may cause the one or more processors to perform one or more of the steps 602-608. Some examples of computing devices, such as computing system 800 may include non-transitory, tangible, machine readable media that include executable code that when run by one or more processors (e.g., processor 812) may cause the one or more processors to perform the steps of process 600. As illustrated, the process 600 includes a number of enumerated steps, but aspects of the process 600 may include additional steps before, after, and in between the enumerated steps. In some aspects, one or more of the enumerated steps may be omitted or performed in a different order.

The process 600 starts at step 602, where the device assessment module 120 receives one or more messages containing event information and the unique device identifier. In some aspects, the event information indicates one or more interactions between the user device and the merchant service that are identified by the merchant server as potential fraudulent activity. Next, at step 604, the device assessment module 120 trains the machine learning-based network included in at least one of the plurality of risk assessment engines with a training dataset that includes the event information.

In some aspects, the machine learning-based network 121 can be iteratively trained using flagged transactions and feedback provided by the merchant server 140. Iteratively training may allow for retraining, adjusting weights and/or values of nodes with trees and/or hidden layers, and otherwise adjust the machine learning-based network 121 to make better or different predictions, such as to lower or remove false positives. Once the machine learning-based network 121 is trained, the machine learning-based network 121 may be provided and/or output to one or more entities for prediction of device risk levels and generation of narratives. For example, an entity (e.g., the service provider server 110 or device assessment module 120 training the machine learning-based network using the training data of transactions) may implement a machine learning-based network within a different risk assessment engine of a plurality of risk assessment engines.

Subsequently, at step 606, the device assessment module 120 generates an adjusted device assessment score for the user device based at least on the training of the machine learning-based network with the event information.

Figure 7:
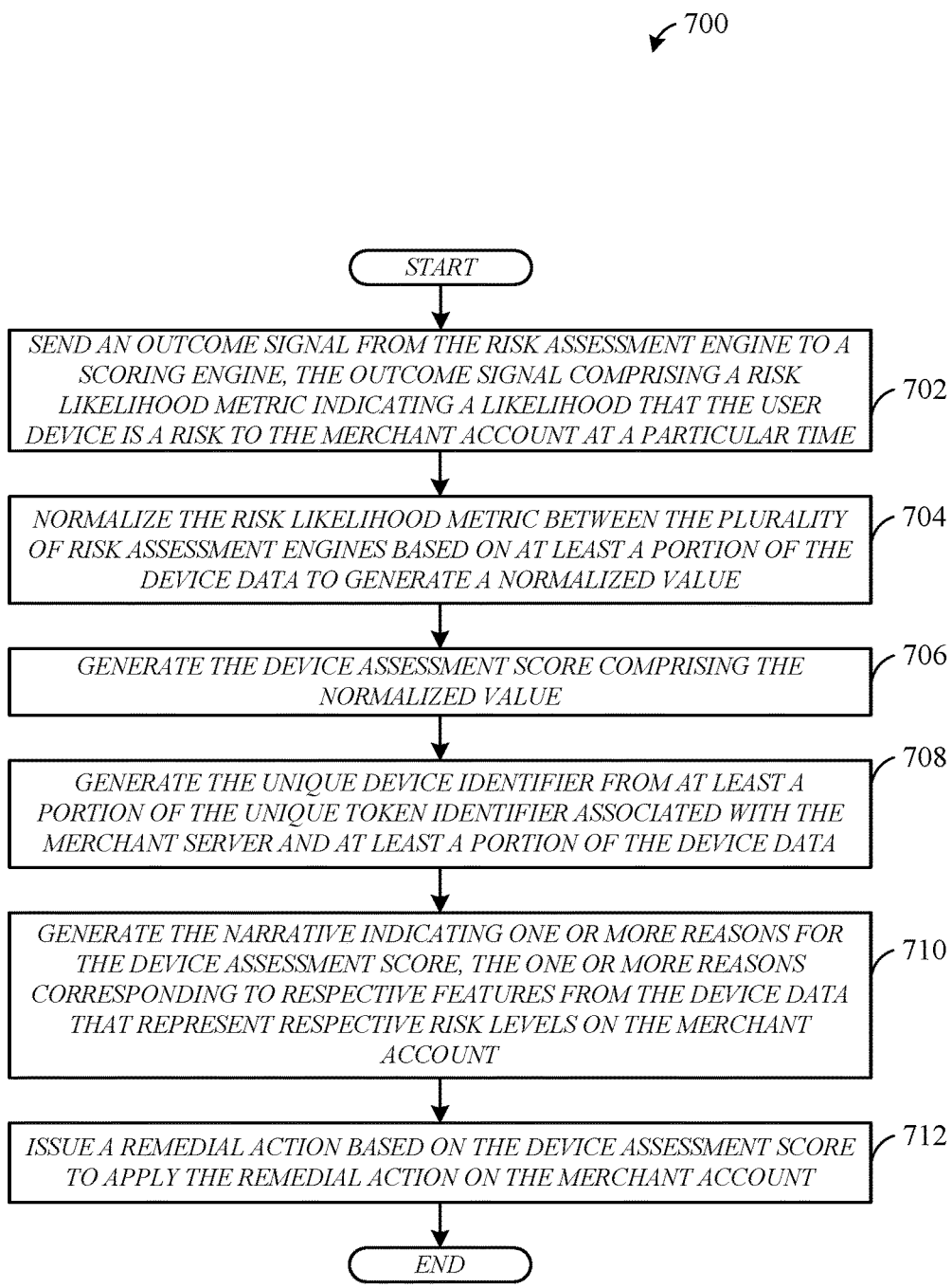
FIG. 7 is a flowchart of an example process of providing a device assessment score from risk assessment of device data, according to an implementation of the present disclosure.

FIG. 7 is a flowchart of an example process 700 of providing a device assessment score from risk assessment of device data, according to an implementation of the present disclosure. One or more of the steps 702-708 of process 700 may be implemented, at least in part, in the form of executable code stored on non-transitory, tangible, machine-readable media that when run by one or more processors may cause the one or more processors to perform one or more of the steps 702-708. Some examples of computing devices, such as computer system 800 may include non-transitory, tangible, machine readable media that include executable code that when run by one or more processors (e.g., processor 812) may cause the one or more processors to perform the steps of process 700. As illustrated, the process 700 includes a number of enumerated steps, but aspects of the process 700 may include additional steps before, after, and in between the enumerated steps. In some aspects, one or more of the enumerated steps may be omitted or performed in a different order.

The process 700 begins at step 702, where the device assessment module 120 sends an outcome signal from the risk assessment engine to the scoring engine. In some aspects, the outcome signal includes a risk likelihood metric indicating a likelihood that the user device is a risk to the merchant account at a particular time. Next, at step 704, the device assessment module 120 normalizes the risk likelihood metric between the plurality of risk assessment engines based on at least a portion of the device data to generate a normalized value. Subsequently, at step 706, the device assessment module 120 generates the device assessment score that includes the normalized value. Next, at step 708, the device assessment module 120 generates the unique device identifier from at least a portion of the unique token identifier associated with the merchant server and at least a portion of the device data. Subsequently, at step 710, the device assessment module 120 generates the narrative indicating one or more reasons for the device assessment score. In some aspects, the one or more reasons correspond to respective features from the device data that represent respective risk levels on the merchant account. Next, at step 712, the device assessment module 120 issues a remedial action based on the device assessment score to apply the remedial action on the merchant account.

Figure 8:
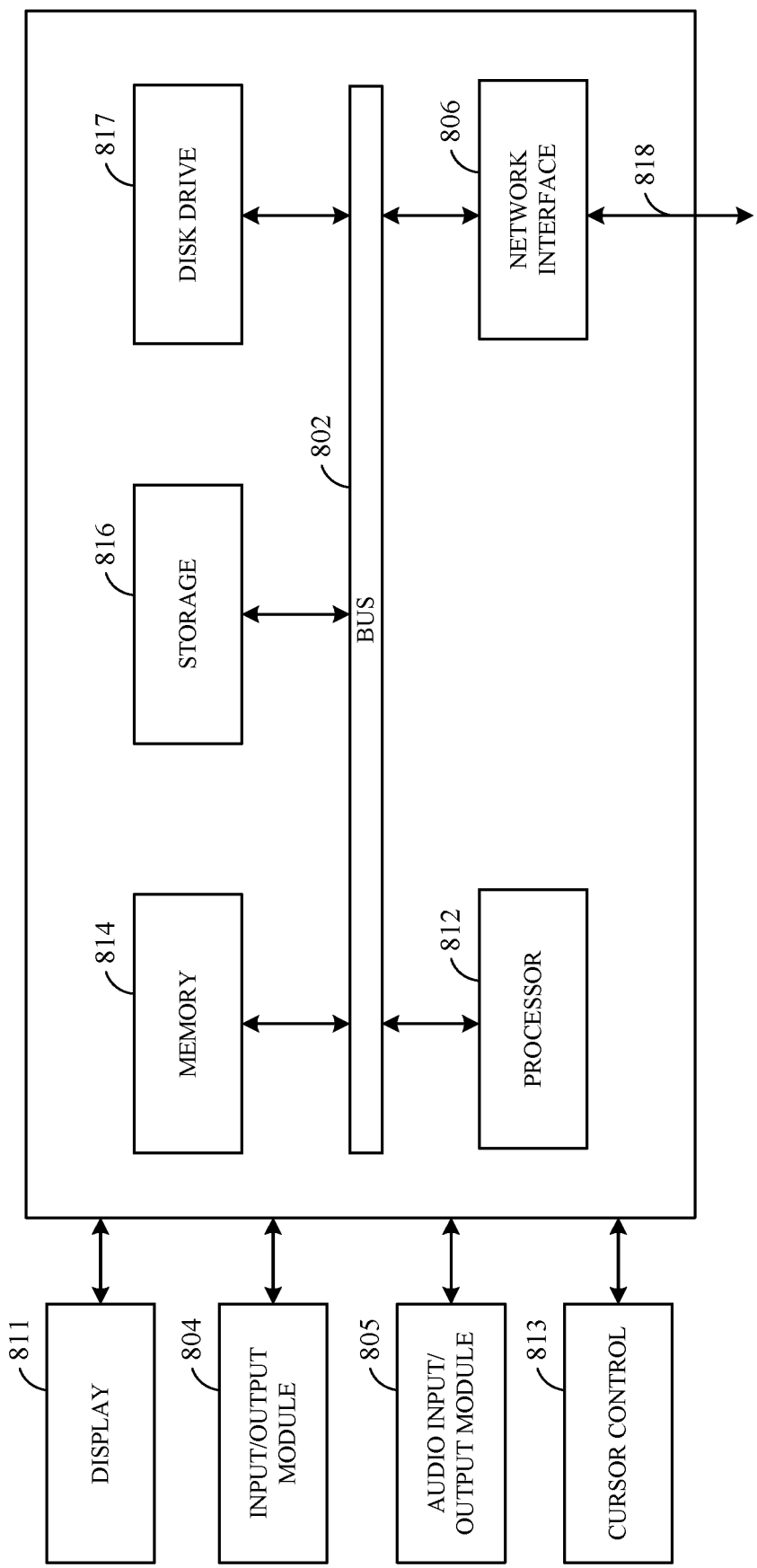
FIG. 8 is a block diagram of a computer system suitable for implementing one or more components in FIG. 1, according to an implementation.

FIG. 8 is a block diagram of a computer system 800 suitable for implementing one or more components in FIG. 1, according to an implementation. In various implementations, a computing device may include a personal computing device e.g., smart phone, a computing tablet, a personal computer, laptop, a wearable computing device such as glasses or a watch, Bluetooth device, key FOB, badge, etc.) capable of communicating with the network. The service provider server 110 may utilize a network computing device (e.g., a network server) capable of communicating with the network 180. It should be appreciated that each of the devices utilized by users and service providers may be implemented as computer system 800 in a manner as follows.

Computer system 800 includes a bus 802 or other communication mechanism for communicating information data, signals, and information between various components of computer system 800. Components include an input/output (I/O) component 804 that processes a user action, such as selecting keys from a keypad/keyboard, selecting one or more buttons, image, or links, and/or moving one or more images, etc., and sends a corresponding signal to bus 802. I/O component 804 may also include an output component, such as a display 811 and a cursor control 813 (such as a keyboard, keypad, mouse, etc.). An optional audio input/output component 805 may also be included to allow a user to use voice for inputting information by converting audio signals. Audio I/O component 805 may allow the user to hear audio. A transceiver or network interface 806 transmits and receives signals between computer system 800 and other devices, such as another communication device, service device, or a service provider server via network 180. In one implementation, the transmission is wireless, although other transmission mediums and methods may also be suitable. One or more processors 812, which can be a micro-controller, digital signal processor (DSP), or other processing component, processes these various signals, such as for display on computer system 800 or transmission to other devices via a communication link 818. Processor(s) 812 may also control transmission of information, such as cookies or IP addresses, to other devices.

Components of computer system 800 also include a system memory component 814 (e.g., RAM), a static storage component 816 (e.g., ROM), and/or a disk drive 817. Computer system 800 performs specific operations by processor(s) 812 and other components by executing one or more sequences of instructions contained in system memory component 814. Logic may be encoded in a computer readable medium, which may refer to any medium that participates in providing instructions to processor(s) 812 for execution. Such a medium may take many forms, including but not limited to, non-volatile media, volatile media, and transmission media. In various implementations, non-volatile media includes optical or magnetic disks, volatile media includes dynamic memory, such as system memory component 814, and transmission media includes coaxial cables, copper wire, and fiber optics, including wires that include bus 802. In one implementation, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various implementations of the present disclosure, execution of instruction sequences to practice the present disclosure may be performed by computer system 800. In various other implementations of the present disclosure, a plurality of computer systems 800 coupled by communication link 818 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various implementations provided by the present disclosure may be implemented using hardware, software, or combinations of hardware and software. Also, where applicable, the various hardware components and/or software components set forth herein may be combined into composite components that include software, hardware, and/or both without departing from the spirit of the present disclosure. Where applicable, the various hardware components and/or software components set forth herein may be separated into sub-components that include software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems that include one or more memories storing various information described herein and one or more processors coupled to the one or more memories and a network, wherein the one or more processors are operable to perform steps as described herein, as non-transitory machine-readable medium that includes a plurality of machine-readable instructions which, when executed by one or more processors, are adapted to cause the one or more processors to perform a method that includes steps described herein, and methods performed by one or more devices, such as a hardware processor, user device, server, and other devices described herein.

The foregoing disclosure is not intended to limit the present disclosure to the precise forms or particular fields of use disclosed. As such, it is contemplated that various alternate implementations and/or modifications to the present disclosure, whether explicitly described or implied herein, are possible in light of the disclosure. Having thus described implementations of the present disclosure, persons of ordinary skill in the art will recognize that changes may be made in form and detail without departing from the scope of the present disclosure. Thus, the present disclosure is limited only by the claims.

What is claimed is:

1. A method of assessing risk through device data, comprising:
   detecting, by a service provider server through a first service server, session activity data for a user device associated with a merchant account registered with a merchant server for a merchant service during a session between the user device and the service provider server;
   determining, by the service provider server, that the session activity data indicates a prohibited activity by the user device with the service provider server;
   determining, by the service provider server from the first service server during the session, device data of user device in response to potentially fraudulent activity;
   receiving, by the service provider server from the merchant server, a request comprising a unique token identifier for initiating a risk assessment operation to generate a device assessment score for the user device associated with the potentially fraudulent activity, the device assessment score indicating a level of risk between the user device and the merchant account;
   selecting a risk assessment engine of a plurality of risk assessment engines to perform the risk assessment operation and to generate the device assessment score and a narrative associated with the device assessment score, wherein the risk assessment engine comprises at least one machine learning model configured to perform the risk assessment operation using a plurality of trained nodes of the at least one machine learning model;

generating, using the at least one machine learning model of the risk assessment engine, the device assessment score based on the session activity data and the device data;

generating, based on the at least one machine learning model, the narrative for the user device, wherein the narrative comprises a textual explanation of the device assessment score;

sending, to the merchant server through an application programming interface, a message comprising a unique device identifier for the user device, the device assessment score, and the narrative associated with the device assessment score;

determining a preventative operation for a computing attack on the merchant server by the user device based on the device assessment score;

executing, with the merchant server, the operation in response to detecting the computing attack;

determining whether the preventative operation was successful in preventing the computing attack;

issuing, by the service provider server, a remedial action for the merchant server based on the preventative operation; and performing, based on feedback to the remedial action, a retraining of the at least one machine learning model.

2. The method of claim 1, further comprising:
receiving, by the service provider server from the merchant server, one or more messages comprising event information and the unique device identifier, wherein the event information indicates one or more interactions between the user device and the merchant server that are identified by the merchant server as the potentially fraudulent activity.

3. The method of claim 2, further comprising:
training the at least one machine learning model that is included in at least one of the plurality of risk assessment engines with a training dataset comprising the event information.

4. The method of claim 3, further comprising:
generating, by the service provider server with the at least one machine learning model, an adjusted device assessment score for the user device based at least on the training of the at least one machine learning model with the event information.

5. The method of claim 1, wherein the device data comprises a plurality of events indicating respective user interactions between the user device and the merchant server through the merchant account over a predetermined range of time.

6. The method of claim 1, further comprising:
sending an outcome signal from the risk assessment engine to a scoring engine, the outcome signal comprising a risk likelihood metric indicating a likelihood that the user device is a risk to the merchant account at a particular time,
wherein the device assessment score is further generated based on the outcome signal, and wherein the device assessment score comprises a normalized value that is representative of the risk likelihood metric.

7. The method of claim 6, wherein the generating the device assessment score comprises normalizing the risk likelihood metric between the plurality of risk assessment engines based on at least a portion of the device data.

8. The method of claim 1, further comprising:
generating, by the service provider server with the risk assessment engine, the unique device identifier from at least a portion of the unique token identifier associated with the merchant server and at least a portion of the device data.

9. The method of claim 1, wherein the textual explanation comprises one or more reasons for the device assessment score, the one or more reasons corresponding to respective features from the device data that represent respective risk levels on the merchant account.

10. The method of claim 1, further comprising:
issuing, by the service provider server with a remedial action engine, a remedial action based on the device assessment score to apply the remedial action on the merchant account.

11. A system comprising:
a non-transitory memory; and
one or more hardware processors coupled to the non-transitory memory and configured to read instructions from the non-transitory memory to cause the system to perform operations comprising:

monitoring, by a service provider server via a first service server, session activity data of a user device associated with a merchant account registered with a merchant server for a merchant service during a session between the user device and the service provider server;

determining, by the service provider server, that the session activity data indicates a prohibited activity;

determining, by the service provider server from the first service server during the session, device data indicating one or more interactions involving potentially fraudulent activity between the user device and a web browser hosted on a web server associated with the merchant server;

receiving, by the service provider server from the merchant server, a request comprising a unique token identifier for initiating a risk assessment operation to generate a device assessment score for the user device associated with the potentially fraudulent activity, the device assessment score indicating a level of risk between the user device and the merchant account;

selecting a risk assessment engine of a plurality of risk assessment engines to perform the risk assessment operation and to generate the device assessment score and a narrative associated with the device assessment score, wherein the risk assessment engine comprises at least one machine learning model configured to perform the risk assessment operation based on a plurality of trained nodes for the at least one machine learning model;

generating, using the at least one machine learning model of the risk assessment engine, the device assessment score based on the session activity data and the device data;

generating, based on the at least one machine learning model, the narrative associated with the device assessment score for the user device;

sending, to the merchant server through an application programming interface, a message comprising a unique device identifier for the user device, the device assessment score and the narrative associated with the device assessment score;

determining a preventative operation for a computing attack on the merchant server by the user device based on the device assessment score;

executing, with the merchant server, the operation in response to detecting the computing attack;

determining whether the preventative operation was successful in preventing the computing attack;

issuing, by the service provider server, a remedial action for the merchant server based on the preventative operation; and performing, based on feedback to the remedial action, a retraining of the at least one machine learning model.

12. The system of claim 11, wherein the operations further comprise:

sending an outcome signal from the risk assessment engine to a scoring engine, the outcome signal comprising a risk likelihood metric indicating a likelihood that the user device is a risk to the merchant account; and generating, by the service provider server with the scoring engine, the device assessment score from the outcome signal, the device assessment score comprising a normalized value that is representative of the risk likelihood metric.

13. The system of claim 12, wherein the generating the device assessment score comprises normalizing the risk likelihood metric between the plurality of risk assessment engines based on at least a portion of the device data.

14. The system of claim 11, wherein the operations further comprise:

generating, by the service provider server with the risk assessment engine, the unique device identifier from at least a portion of the unique token identifier associated with the merchant server and at least a portion of the device data.

15. The system of claim 11, wherein the operations further comprise:

generating, by the service provider server with the risk assessment engine, the narrative that indicates one or more reasons for the device assessment score, the one or more reasons corresponding to respective features from the device data that represent respective risk levels on the merchant account.

16. A non-transitory machine-readable medium having stored thereon machine-readable instructions executable to cause a machine to perform operations comprising:

receiving, by a service provider server through a first service server, session activity data for a user device associated with a merchant account registered with a merchant server for a merchant service during a session between the user device and the service provider server;

determining, by the service provider server, that the session activity data indicates a prohibited activity by the user device with the service provider server;

determining, by the service provider server from the first service server during the session, device data of the user device associated with potentially fraudulently activity;

receiving, by the service provider server from the merchant server, a request comprising a unique token identifier for initiating a risk assessment operation to generate a device assessment score for the user device associated with the potentially fraudulent activity, the device assessment score indicating a level of risk between the user device and the merchant account;

selecting a risk assessment engine of a plurality of risk assessment engines to perform the risk assessment operation and to generate the device assessment score and a narrative associated with the device assessment score, wherein the risk assessment engine uses at least one machine learning model configured to perform the risk assessment operation based on a plurality of trained nodes for the at least one machine learning model;

generating, using the at least one machine learning model of the risk assessment engine, the device assessment score based on the session activity data and the device data;

generating, using the at least one machine learning model, the narrative associated with the device assessment score for the user device;

sending, to the merchant server through an application programming interface, a message comprising a unique device identifier for the user device, the device assessment score and the narrative associated with the device assessment score;

determining a preventative operation for a computing attack on the merchant server by the user device based on the device assessment score;

executing, with the merchant server, the operation in response to detecting the computing attack;

determining whether the preventative operation was successful in preventing the computing attack;

issuing, by the service provider server, a remedial action for the merchant server based on the preventative operation; and performing, based on feedback to the remedial action, a retraining of the at least one machine learning model.

17. The non-transitory machine-readable medium of claim 16, wherein the operations further comprise:

sending an outcome signal from the risk assessment engine to a scoring engine, the outcome signal comprising a risk likelihood metric indicating a likelihood that the user device is a risk to the merchant account; and generating, by the service provider server with the scoring engine, the device assessment score from the outcome signal, the device assessment score comprising a normalized value that is representative of the risk likelihood metric.

18. The non-transitory machine-readable medium of claim 16, wherein the operations further comprise:

generating, by the service provider server with the risk assessment engine, the unique device identifier from at least a portion of the unique token identifier associated with the merchant server and at least a portion of the device data.

19. The non-transitory machine-readable medium of claim 16, wherein the operations further comprise:

generating, by the service provider server with the risk assessment engine, the narrative that indicates one or more reasons for the device assessment score, the one or more reasons corresponding to respective features from the device data that represent respective risk levels on the merchant account.

20. The non-transitory machine-readable medium of claim 16, wherein the operations further comprise:

receiving, by the service provider server from the merchant server, one or more messages comprising event information and the unique device identifier, wherein the event information indicates one or more interactions between the user device and the merchant server that are identified by the merchant server as the potentially fraudulent activity; and training a machine learning-based network included in at least one of the plurality of risk assessment engines with a training dataset comprising the event information; and generating, by the service provider server with the machine learning-based network, an adjusted device assessment score for the user device based at least on the training of the machine learning-based network with the event information.

* * * * *